US012639715B2

(12) United States Patent
Lee et al.

(10) Patent No.: US 12,639,715 B2
(45) Date of Patent: May 26, 2026

(54) AUGMENTED REALITY DEVICE FOR PERFORMING PAYMENT BY USING GAZE INFORMATION OF USER, AND METHOD OPERATED BY THE AUGMENTED REALITY DEVICE

(71) Applicant: SAMSUNG ELECTRONICS CO., LTD., Suwon-si (KR)

(72) Inventors: Wonwoo Lee, Suwon-si (KR); Injung Lee, Suwon-si (KR); Jeongpyo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 85 days.

(21) Appl. No.: 18/821,488

(22) Filed: Aug. 30, 2024

(65) Prior Publication Data

US 2024/0420143 A1      Dec. 19, 2024

Related U.S. Application Data

(63) Continuation of application No. PCT/KR2024/007547, filed on Jun. 3, 2024.

(30) Foreign Application Priority Data

Jun. 1, 2023    (KR) ......................... 10-2023-0071180
Jul. 28, 2023    (KR) ......................... 10-2023-0099054

(51) Int. Cl.
*G06Q 20/40* (2012.01)
*G06Q 20/32* (2012.01)
*H04N 23/69* (2023.01)

(52) U.S. Cl.
CPC ... *G06Q 20/40145* (2013.01); *G06Q 20/3276* (2013.01); *H04N 23/69* (2023.01)

(58) Field of Classification Search
None
See application file for complete search history.

(56) References Cited

U.S. PATENT DOCUMENTS 9,151,953 B2    10/2015  Qaddoura
9,734,372 B2     8/2017  Lindbo et al.
(Continued)

FOREIGN PATENT DOCUMENTS

CN          108229399 A     6/2018
CN          112507799 A     3/2021
(Continued)

OTHER PUBLICATIONS

International Search Report and Written Opinion issued Sep. 3, 2024 by the International Searching Authority in International Patent Application No. PCT/KR2024/007547. (PCT/ISA/220, PCT/ISA/210 and PCT/ISA/237).

*Primary Examiner* — Matthew S Gart
*Assistant Examiner* — Amit Patel
(74) *Attorney, Agent, or Firm* — Sughrue Mion, PLLC

(57) ABSTRACT

Provided are an augmented reality device for performing a payment by recognizing a payment code and a method of operating the same. The method may include obtaining, based on gaze information of both eyes of the user, a gaze point where gaze directions of the both eyes of the user converge, wherein the gaze information is obtained using at least one gaze tracking sensor; determine a region of interest corresponding to the gaze point on an image obtained through the camera; enlarge the region of interest; recognize a payment code included in the enlarged region of interest; and perform a payment by using the payment code.

15 Claims, 16 Drawing Sheets

① OBTAIN GAZE POINT WHERE GAZE DIRECTIONS OF BOTH EYES OF USER CONVERGE

② DETERMINE REGION OF INTEREST ON IMAGE OBTAINED THROUGH CAMERA, BASED ON GAZE POINT

③ ENLARGE REGION OF INTEREST

④ RECOGNIZE PAYMENT CODE FROM REGION OF INTEREST AND PERFORM PAYMENT

(56)         References Cited

U.S. PATENT DOCUMENTS

| | | | |
|---|---|---|---|
| 10,102,627 | B2 | 10/2018 | Tsuda et al. |
| 2015/0168727 | A1 | 6/2015 | Qaddoura |
| 2019/0011703 | A1* | 1/2019 | Robaina ................ G06T 19/006 |

FOREIGN PATENT DOCUMENTS

| | | | |
|---|---|---|---|
| JP | 2006-54519 | A | 2/2006 |
| JP | 2010-200209 | A | 9/2010 |
| JP | 2012-8746 | A | 1/2012 |
| JP | 5548042 | B2 | 7/2014 |
| JP | 2015-141215 | A | 8/2015 |
| JP | 5915296 | B2 | 5/2016 |
| JP | 6314641 | B2 | 4/2018 |
| JP | 2021-114151 | A | 8/2021 |

* cited by examiner

① OBTAIN GAZE POINT WHERE GAZE DIRECTIONS OF BOTH EYES OF USER CONVERGE

② DETERMINE REGION OF INTEREST ON IMAGE OBTAINED THROUGH CAMERA, BASED ON GAZE POINT

③ ENLARGE REGION OF INTEREST

④ RECOGNIZE PAYMENT CODE FROM REGION OF INTEREST AND PERFORM PAYMENT

FIG. 12

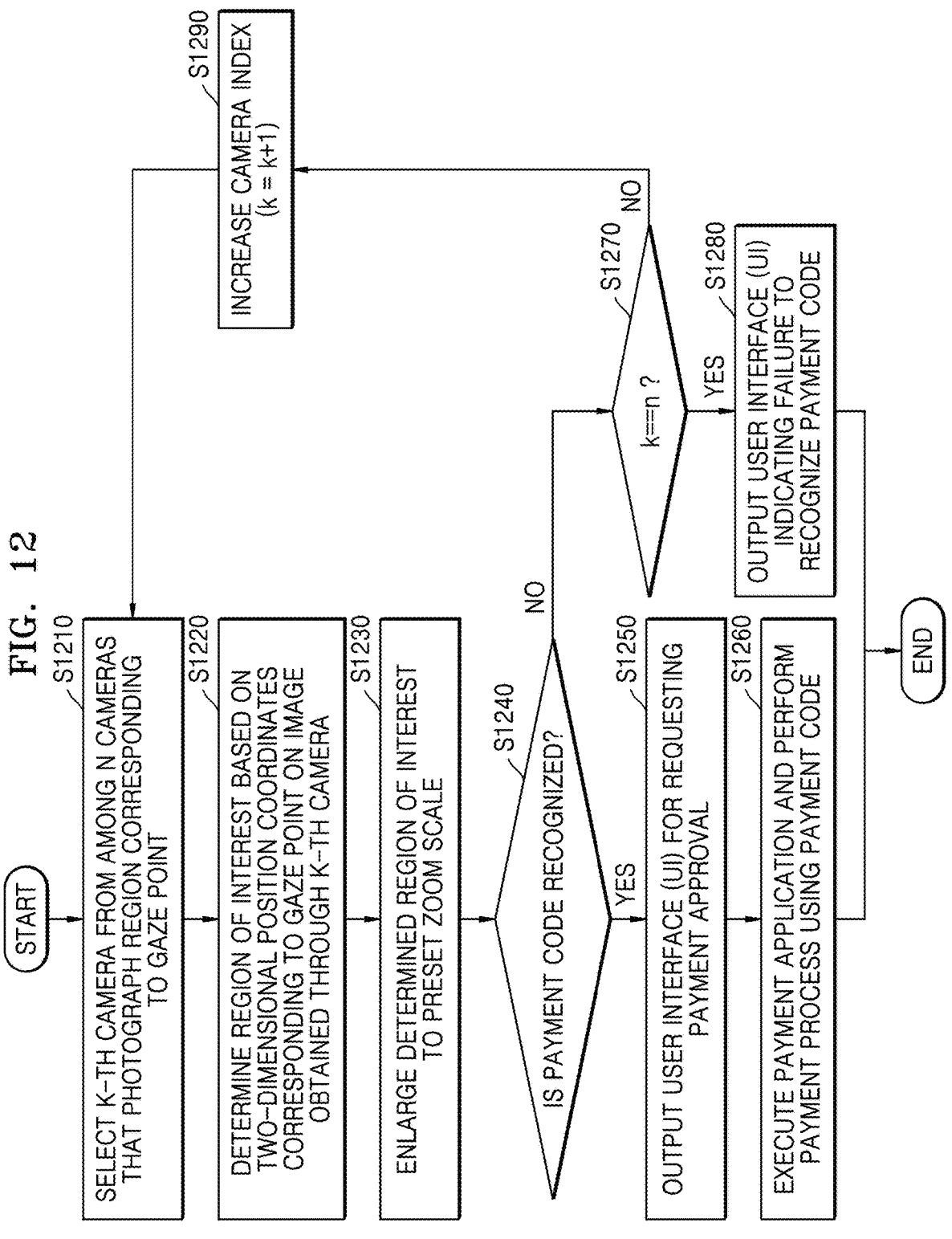

START

S1210 — SELECT K-TH CAMERA FROM AMONG N CAMERAS THAT PHOTOGRAPH REGION CORRESPONDING TO GAZE POINT

S1220 — DETERMINE REGION OF INTEREST BASED ON TWO-DIMENSIONAL POSITION COORDINATES CORRESPONDING TO GAZE POINT ON IMAGE OBTAINED THROUGH K-TH CAMERA

S1230 — ENLARGE DETERMINED REGION OF INTEREST TO PRESET ZOOM SCALE

S1240 — IS PAYMENT CODE RECOGNIZED?

NO → S1270 — k==n ?

S1270 NO → S1290 — INCREASE CAMERA INDEX (k = k+1)

S1270 YES → S1280 — OUTPUT USER INTERFACE (UI) INDICATING FAILURE TO RECOGNIZE PAYMENT CODE

S1240 YES → S1250 — OUTPUT USER INTERFACE (UI) FOR REQUESTING PAYMENT APPROVAL

S1260 — EXECUTE PAYMENT APPLICATION AND PERFORM PAYMENT PROCESS USING PAYMENT CODE

END

① OBTAIN GAZE POINT WHERE GAZE DIRECTIONS OF BOTH EYES OF USER CONVERGE

② DETERMINE REGION OF INTEREST ON IMAGE OBTAINED THROUGH CAMERA, BASED ON GAZE POINT

③ ENLARGE REGION OF INTEREST

④ EXTRACT AND OUTPUT TEXT FROM REGION OF INTEREST BY PERFORMING OCR

AUGMENTED REALITY DEVICE FOR PERFORMING PAYMENT BY USING GAZE INFORMATION OF USER, AND METHOD OPERATED BY THE AUGMENTED REALITY DEVICE

CROSS REFERENCE TO RELATED APPLICATIONS

This application is claims priority to International Application No. PCT/KR2024/007547, filed at the Korea Intellectual Property Office, on Jun. 3, 2024, Korean Application Nos. 10-2023-0071180 and 10-2023-0099054, filed at the Korea Intellectual Property Office, on Jun. 1, 2023, and Jul. 28, 2023, respectively, and the disclosures of which are incorporated by reference herein in their entireties.

FIELD

The disclosure relates to an augmented reality device for performing a payment by using gaze information of a user, and a method operated by the augmented reality device. More particularly, the disclosure relates to an augmented reality device for recognizing a payment code at which a user is gazing by using a gaze tracking sensor and then performing a payment, and an operation method of the augmented reality device.

BACKGROUND

Augmented reality (AR) is a technology that overlays a virtual image on a physical environment space of the real world or on a real-world object, and has the advantage of providing a fusion of virtual objects and virtual information in a real space. AR devices (e.g., smart glasses) using AR technology are efficiently used in everyday life, for example, for information search, route guidance, or image capture with a camera. In particular, smart glasses are also worn as fashion items and may be mainly used for outdoor activities.

Related-art payment systems using a payment code (e.g., a barcode or a Quick Response (QR) code) require a process of holding a mobile device, such as a smart phone, near a payment code such that a sufficiently large image of the payment code may be captured by using a camera of the mobile device. However, when using an augmented reality device, the user generally wears the augmented reality device on his/her head and thus needs to move very close to a payment code to allow the augmented reality device to recognize the payment code through its camera, which may cause discomfort and awkwardness to the user wearing the augmented reality device on his/her head. In addition, the camera mounted on the augmented reality device is generally a wide-angle or ultra-wide-angle camera, and thus, in an image obtained by the camera photographing the payment code, the payment code occupies only a relatively small area of the entire region of the image. Accordingly, the payment systems using augmented reality devices have a low recognition rate of payment codes and poor user convenience.

SUMMARY

An aspect of the disclosure provides a method, operated by an augmented reality device, of performing a payment by using gaze information of a user. The method operated by an augmented reality device according to an embodiment of the disclosure may include obtaining, based on gaze information of both eyes of the user, a gaze point where gaze directions of both eyes of the user converge, wherein the gaze information is obtained using at least one gaze tracking sensor; determining a region of interest corresponding to the gaze point on an image obtained through a camera; enlarging the region of interest; recognizing a payment code included in the enlarged region of interest; and performing a payment by using the payment code. Another aspect of the disclosure provides an augmented reality device for performing a payment by using gaze information of a user. The augmented reality device according to an embodiment of the disclosure may include at least one gaze tracking sensor configured to obtain gaze information of both eyes of the user, a camera configured to obtain an image, a memory storing at least one instruction, and at least one processor configured to execute the at least one instruction. The at least one processor may be configured to obtaining, based on gaze information of both eyes of the user, a gaze point where gaze directions of the both eyes of the user converge, wherein the gaze information is obtained using at least one gaze tracking sensor; determine a region of interest corresponding to the gaze point on an image obtained through the camera; enlarge the region of interest; recognize a payment code included in the enlarged region of interest; and perform a payment by using the payment code.

Another aspect of the disclosure provides a computer program product including a computer-readable storage medium. The storage medium may include instructions, which are readable by an augmented reality device and causes the augmented reality device to perform obtaining, based on gaze information of both eyes of the user, a gaze point where gaze directions of the both eyes of the user converge, wherein the gaze information is obtained using at least one gaze tracking sensor; determining a region of interest corresponding to the gaze point on an image obtained through the camera; enlarging the region of interest; recognizing a payment code from the enlarged region of interest; and performing a payment by using the payment code.

BRIEF DESCRIPTION OF THE DRAWINGS

The disclosure may be readily understood with a combination of the following detailed descriptions and the accompanying drawings, wherein reference numbers refer to structural elements.

FIG. 12 is a flowchart of a method in which an augmented reality device recognizes a payment code, according to an embodiment of the disclosure.

DETAILED DESCRIPTION

Figure 1:
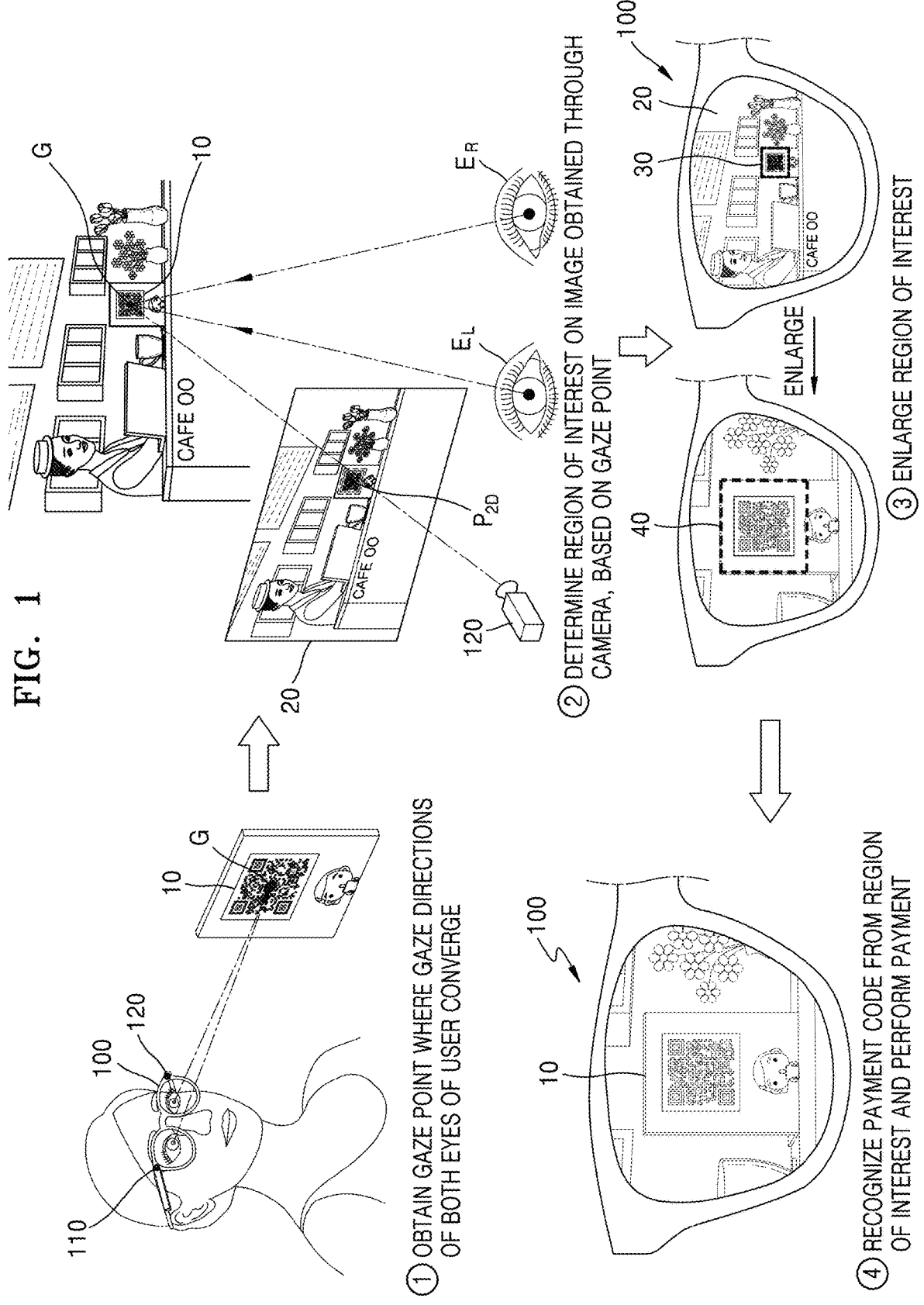
FIG. 1 is a diagram illustrating operations of recognizing a payment code by using gaze direction information of a user performed by an augmented reality device according to an embodiment of the disclosure.

Although the terms used herein for describing embodiments of the disclosure are selected from among common terms that are currently widely used in consideration of their function in the disclosure, the terms may be different according to an intention of those of ordinary skill in the art, a precedent, or the advent of new technology. Also, in particular cases, the terms are discretionally selected by the applicant of the disclosure, in which case, the meaning of those terms will be described in detail in the corresponding embodiment. Therefore, the terms used herein are not merely designations of the terms, but the terms are defined based on the meaning of the terms and content throughout the disclosure.

The singular expression may also include the plural meaning as long as it is not inconsistent with the context. All the terms used herein, including technical and scientific terms, may have the same meanings as those generally understood by those of skill in the art.

Throughout the disclosure, when a part "includes" a component, it means that the part may additionally include other components rather than excluding other components as long as there is no particular opposing recitation. In addition, as used herein, terms such as " . . . er (or)", " . . . unit", " . . . module", etc., denote a unit that performs at least one function or operation, which may be implemented as hardware or software or a combination thereof.

As used herein, the expression "configured to" may be interchangeably used with, for example, "suitable for", "having the capacity to", "designed to", "adapted to", "made to", or "capable of", according to a situation. The expression "configured to" may not imply only "specially designed to" in a hardware manner. Instead, in a certain circumstance, the expression "a system configured to" may indicate the system "capable of" together with another device or components. For example, "a processor configured (or set) to perform A, B, and C" may imply a dedicated processor (e.g., an embedded processor) for performing a corresponding operation or a generic-purpose processor (e.g., central processing unit (CPU) or an application processor) capable of performing corresponding operations by executing one or more software programs stored in a memory. The processor may include one or more of a central processing unit (CPU), a graphics processing unit (GPU), an accelerated processing unit (APU), a many integrated core (MIC), a field-programmable gate array (FPGA), a digital signal processor (DSP), a neural processing unit (NPU), a hardware accelerator, or a machine learning accelerator. The one or more processors are able to perform control of any one or any combination of the other components of the computing device, and/or perform an operation or data processing relating to communication. The one or more processors execute one or more programs stored in a memory.

Also, in the disclosure, it should be understood that when components are "connected" or "coupled" to each other, the components may be directly connected or coupled to each other, but may alternatively be connected or coupled to each other with a component therebetween, unless specified otherwise.

The term 'augmented reality' herein denotes a technology that provides viewing of a virtual image in a physical environment space of the real world or viewing of a virtual image together with a real object.

In addition, as used herein, the term 'augmented reality device' denotes a device capable of creating 'augmented reality', and includes not only augmented reality glasses resembling eyeglasses that are typically worn on a user's face but also head-mounted display (HMD) apparatuses and augmented reality helmets that are worn on a user's head, or the like.

In the disclosure, the term 'payment code' refers to a sign code containing information for payment of a product or service. In an embodiment of the disclosure, a payment code may be a barcode containing a plurality of bars or a Quick Response (QR) code containing a plurality of squares. A device (e.g., a mobile device or an augmented reality device) may obtain an image by photographing a payment code through a camera, obtain information for payment (e.g., identification information or price information of a product or service) by decoding the payment code in the obtained image, and perform a payment process by using the obtained information.

Hereinafter, an embodiment of the disclosure will be described in detail with reference to the accompanying drawings to allow those of skill in the art to easily carry out the embodiment. The disclosure may, however, be embodied in many different forms and should not be construed as being limited to an embodiment set forth herein.

Hereinafter, embodiments of the disclosure will be described in detail with reference to the drawings.

FIG. 1 is a diagram illustrating operations, performed by an augmented reality device 100 of the disclosure, of recognizing a payment code 10 by using gaze direction information of a user, and performing a payment.

Referring to FIG. 1, the augmented reality device 100 is a device capable of expressing augmented reality by providing viewing of a virtual image on a physical environment space of the real world or viewing of a virtual image together with a real object, and may be, for example, augmented reality glasses resembling eyeglasses to be worn on a user's face. However, the disclosure is not limited thereto, and the augmented reality device 100 may be an HMD apparatus or an augmented reality helmet to be worn on a user's head.

The augmented reality device 100 may include at least one gaze tracking sensor 110 and a camera 120. The augmented reality device 100 obtains gaze information of both eyes of the user by using the at least one gaze tracking sensor 110, and obtains a gaze point G where the gaze directions of both eyes of the user converge in a three-dimensional space, based on the obtained gaze information. This is illustrated in operation 1.

The augmented reality device 100 determines a region of interest 30 on an image 20 obtained through the camera 120, based on the gaze point G. This is illustrated in operation 2.

The augmented reality device 100 enlarges the region of interest 30. This is illustrated in operation 3.

The augmented reality device 100 recognizes the payment code 10 from an enlarged region of interest 40 and performs a payment by using the recognized payment code 10. This is illustrated in operation 4.

Hereinafter, functions and/or operations of the augmented reality device 100 according to the embodiment illustrated in FIG. 1 will be described in detail with reference to FIG. 2 together.

Figure 2:
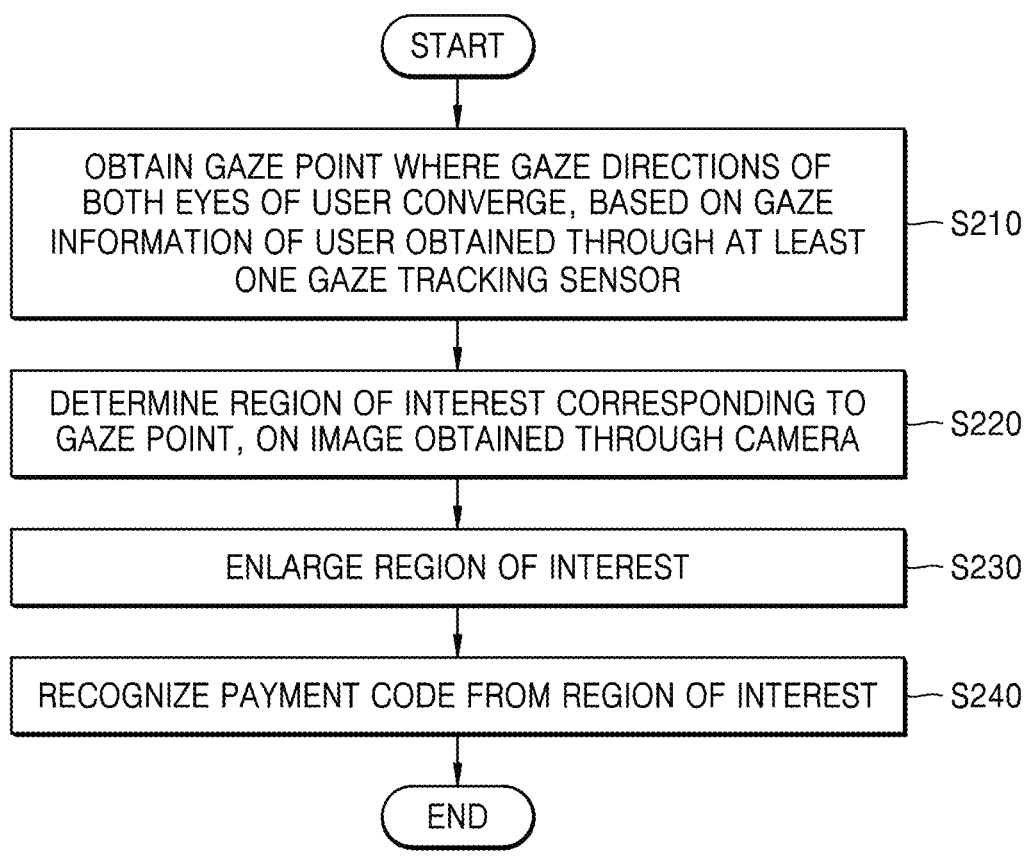
FIG. 2 is a flowchart of a method in which an augmented reality device recognizes a payment code using gaze direction information of a user, according to an embodiment of the disclosure.

FIG. 2 is a flowchart of a method, performed by the augmented reality device 100, of recognizing a payment code by using gaze direction information of a user, according to an embodiment of the disclosure.

In operation S210, the augmented reality device 100 obtains a gaze point where the gaze directions of both eyes of the user converge, based on gaze information of the user obtained through at least one gaze tracking sensor. In an embodiment of the disclosure, the augmented reality device 100 may include a left-eye gaze tracking sensor configured to detect the gaze direction of the left eye of the user, and a right-eye gaze tracking sensor configured to detect the gaze direction of the right eye of the user. Detecting a gaze direction of the user may include obtaining gaze information related to a gaze of the user. In combination with operation 1 of FIG. 1 the gaze tracking sensor 110 may include a left-eye gaze tracking sensor and a right-eye gaze tracking sensor. The augmented reality device 100 may obtain information about the gaze direction of the left eye of the user through the left-eye gaze tracking sensor, and obtain information about the gaze direction of the right eye of the user through the right-eye gaze tracking sensor. The augmented reality device 100 may detect the gaze point G where the obtained gaze direction of the left eye of the user and the gaze direction of the right eye of the user converge, and obtain three-dimensional position coordinate information of the gaze point G. In an embodiment of the disclosure, the gaze point G determined by the gaze directions of both eyes of the user may be located at the payment code 10 in the three-dimensional space of the real world.

In the disclosure, the term 'payment code' refers to a sign code containing information for payment of a product or service, and may include, for example, a barcode or a QR code.

In operation S220, the augmented reality device 100 determines a region of interest corresponding to the gaze point, on an image obtained through the camera. In an embodiment of the disclosure, the augmented reality device 100 may determine the region of interest on the image based on two-dimensional position coordinate information corresponding to the gaze point. In combination with operation 2 of FIG. 1 the augmented reality device 100 may obtain the image 20 by using the camera 120 to photograph a region at which the user is gazing, that is, a region corresponding to the gaze point G. In an embodiment of the disclosure, the camera 120 is configured as a red-green-blue (RGB) camera and may obtain a two-dimensional (2D) image 20 by photographing the real world. The augmented reality device 100 may identify a point $P_{2D}$ corresponding to the gaze point G on the image 20 by mapping, to the image 20, the gaze point G in the three-dimensional space where the gaze directions of the left eye $E_L$ and the right eye $E_R$ of the user converge, and obtain two-dimensional position coordinate information of the point $P_{2D}$. In an embodiment of the disclosure, the augmented reality device 100 may obtain the two-dimensional position coordinate information of the point $P_{2D}$ corresponding to the gaze point G by mapping the gaze point G in the three-dimensional space to the two-dimensional image 20 based on at least one of the position, field of view, or intrinsic parameters of the camera 120.

The augmented reality device 100 may determine, as the region of interest 30, a region having a preset size centered on the obtained two-dimensional position coordinates of the point $P_{2D}$. In an embodiment of the disclosure, the region of interest 30 may include an image region of the payment code 10.

In operation S230, the augmented reality device 100 enlarges the region of interest. In an embodiment of the disclosure, the augmented reality device 100 may enlarge the region of interest to a preset zoom scale. In combination with operation 3 of FIG. 1 the augmented reality device 100 may enlarge the region of interest 30 according to a plurality of preset zoom scales (n preset zoom scales). In an embodiment of the disclosure, the augmented reality device 100 may enlarge the region of interest 30 by using a digital zoom or optical zoom function of the camera 120.

In operation S240, the augmented reality device 100 recognizes the payment code from the region of interest. In combination with operation 4 of FIG. 1 the augmented reality device 100 may recognize the payment code 10 from the enlarged region of interest 40 of the image 20 according to a result of the enlargement. In an embodiment of the disclosure, the augmented reality device 100 may recognize the payment code 10 from the enlarged region of interest 40 by performing payment code detection, for example, barcode detection or QR code detection.

The augmented reality device 100 may execute a payment application and perform a payment process by using the recognized payment code 10.

FIGS. 1 and 2 illustrate an embodiment in which the augmented reality device 100 recognizes the payment code 10, but an embodiment of the disclosure is not limited thereto. In an embodiment of the disclosure, the payment code 10 may not be recognized from the enlarged region of interest 40. An operation of the augmented reality device 100 according to a result of recognizing the payment code 10 will be described in detail with reference to FIG. 3.

Figure 3:
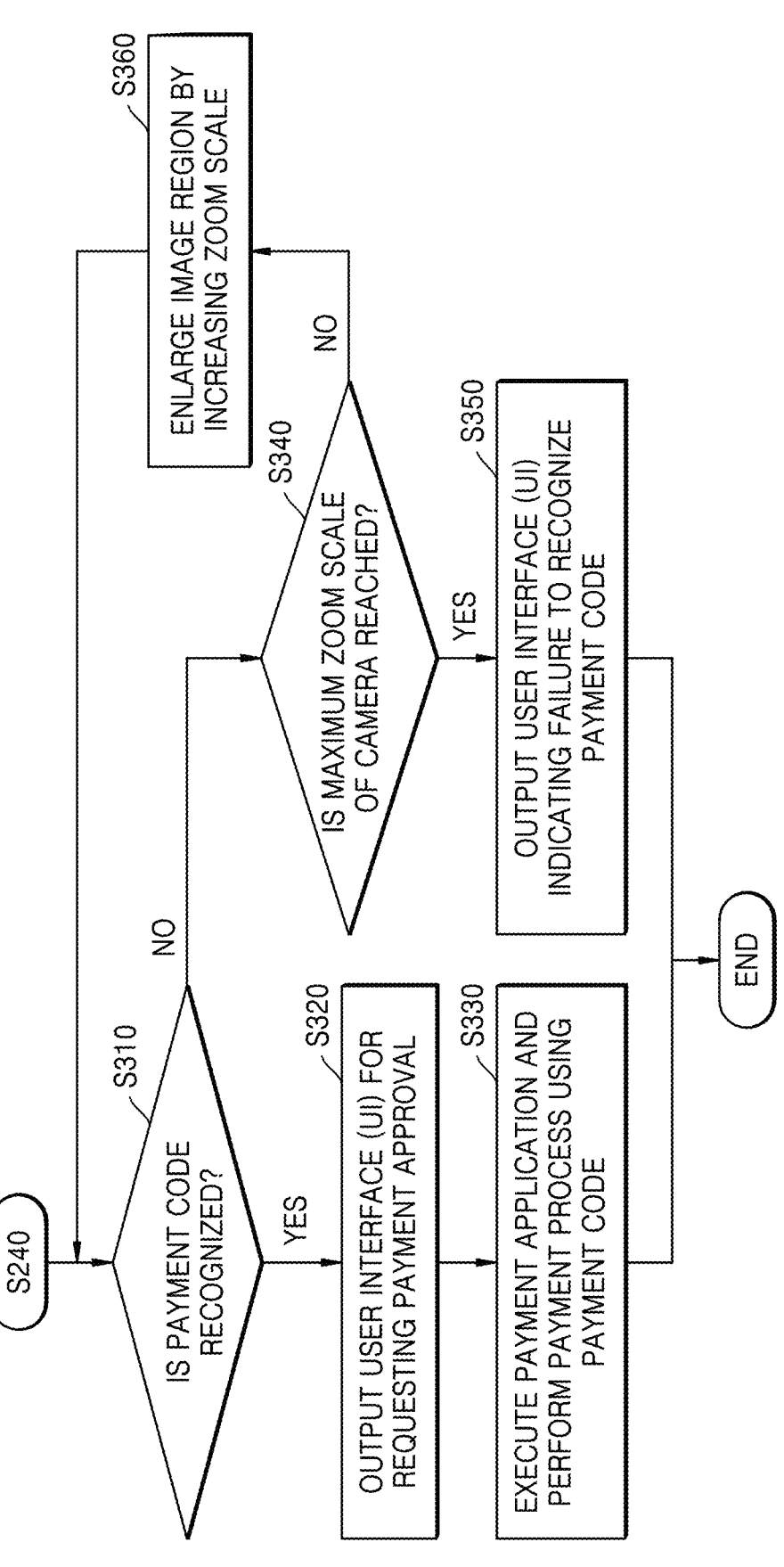
FIG. 3 is a flowchart of a method in which an augmented reality device recognizes a payment code, according to an embodiment of the disclosure.

FIG. 3 is a flowchart of an operation method performed by the augmented reality device 100 according to whether a payment code is recognized, according to an embodiment of the disclosure.

In operation S310, the augmented reality device 100 determines whether the payment code is recognized. In an embodiment of the disclosure, the augmented reality device 100 may determine whether the payment code has been properly recognized in a region enlarged to a preset zoom scale.

In an embodiment of the disclosure, while operation S310 is performed, the augmented reality device 100 may output a notification message that payment code recognition is in progress.

When it is determined that the payment code has been recognized in operation S320, the augmented reality device 100 outputs a user interface for requesting payment approval. In an embodiment of the disclosure, the augmented reality device 100 may obtain identification information, price information, and the like of a product or service from the recognized payment code, and output a notification message for asking the user whether to approve the payment, along with the obtained information.

In operation S330, the augmented reality device 100 executes a payment application and performs a payment process using the payment code.

When it is determined that the payment code has not been recognized properly in operation S340, the augmented reality device 100 determines whether the maximum magnification scale of the camera has been reached. In an embodiment of the disclosure, the augmented reality device 100 may determine whether the zoom scale to which the region of interest is enlarged is the maximum zoom scale by digital zoom or optical zoom of the camera 120.

When it is determined that the maximum zoom scale of the camera has been reached, e.g., operation S350, the augmented reality device 100 outputs a user interface indicating a failure to recognize the payment code. For example, the augmented reality device 100 may output a notification message indicating a payment failure, such as "Payment was declined because the barcode (or QR code) was not recognized".

When it is determined that the maximum zoom scale of the camera has not been reached, e.g., in operation S360, the augmented reality device 100 enlarges the image region by increasing the zoom magnification scale. In an embodiment of the disclosure, the augmented reality device 100 may increase the zoom magnification scale to be greater than the existing zoom scale to enlarge the region of interest. Thereafter, the augmented reality device 100 may return to operation S310 to determine again whether the payment code is recognized from the image region enlarged to the increased zoom magnification scale.

In general, the augmented reality device 100 is worn on the user's head or face, and thus, when attempting to make a payment using a payment code, the user needs to move the camera 120 of the augmented reality device 100 significantly close to the payment code. This may cause discomfort and awkwardness to the user wearing the augmented reality device 100 on his/her head. In addition, the camera 120 mounted on the augmented reality device 100 is generally a wide-angle or ultra-wide-angle camera, and thus, in an image obtained by the camera 120 photographing a payment code, the payment code occupies only a relatively small area of the entire region of the image. Accordingly, a payment system using the augmented reality device 100 has a low recognition rate of payment codes and poor user convenience.

The disclosure provides the augmented reality device 100 capable of automatically recognizing a payment code even at a distance based on gaze direction information of a user obtained by using the gaze tracking sensor 110, thereby improving user convenience, and an operation method of the augmented reality device 100.

The augmented reality device 100 according to the embodiments herein may obtain gaze direction information of the user gazing at the payment code 10 by using the gaze tracking sensor 110, determine, based on the gaze direction information, the region of interest 30 including the payment code 10 on the image 20 obtained through the camera 120, recognize the payment code 10 by enlarging the region of interest, and perform a payment process by using the recognized payment code 10. The augmented reality device 100 according to an embodiment of the disclosure may improve user convenience by enabling convenient payment code-based payment without the user needing to bring his/her head to a position adjacent to the payment code 10. In addition, the augmented reality device 100 according to an embodiment of the disclosure recognizes the payment code 10 by enlarging a region corresponding to the gaze point G (see FIG. 1) on an image even in a case in which the camera 120 is a wide-angle or ultra-wide-angle camera, thereby improving the recognition rate of the payment code 10.

In addition, the operation method of the augmented reality device 100 according to an embodiment of the disclosure is applicable to various fields in addition to recognition of the payment code 10, for example, recognition of a distant object or text, or translation of a distant text. A detailed embodiment in which the augmented reality device 100 recognizes a distant text will be described in detail with reference to FIGS. 14 and 15.

Figure 4:
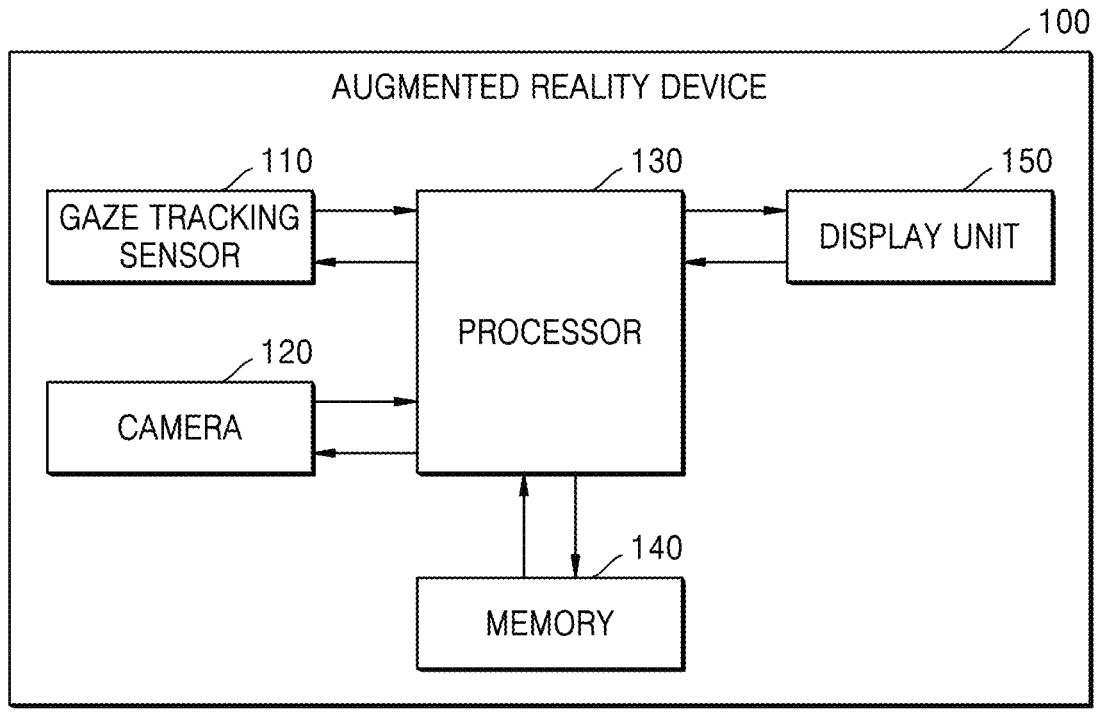
FIG. 4 is a block diagram illustrating components of an augmented reality device according to an embodiment of the disclosure.

FIG. 4 is a block diagram illustrating components of the augmented reality device 100 according to an embodiment of the disclosure.

Referring to FIG. 4, the augmented reality device 100 may include the gaze tracking sensor 110, the camera 120, a processor 130, a memory 140, and a display unit 150. The gaze tracking sensor 110, the camera 120, the processor 130, the memory 140, and the display unit 150 may be electrically and/or physically connected to each other. FIG. 4 illustrates only components for describing an operation of the augmented reality device 100, and components included in the augmented reality device 100 are not limited to those illustrated in FIG. 4. In an embodiment of the disclosure, the augmented reality device 100 may further include a communication interface for performing data communication with an external device or a payment server. In an embodiment of the disclosure, the augmented reality device 100 may be implemented as a portable device, and in this case, the augmented reality device 100 may further include a battery to supply driving power to the gaze tracking sensor 110, the camera 120, the processor 130, and the display unit 150.

The gaze tracking sensor 110 is a device configured to detect the gaze directions of the eyes of a user and track the gaze directions. The gaze tracking sensor 110 may detect a gaze direction of a user by detecting an image of a human eye or pupil or detecting the direction or amount of light such as near-infrared rays, which is reflected by a cornea. In an embodiment of the disclosure, the gaze tracking sensor 110 may include an infrared light source and an infrared camera.

The gaze tracking sensor 110 may include a left-eye gaze tracking sensor and a right-eye gaze tracking sensor, and may detect the gaze directions of the left eye and the right eye of the user, respectively. Detecting a gaze direction of the user may include obtaining gaze information related to a gaze of the user. In an embodiment of the disclosure, the gaze tracking sensor 110 may detect a gaze point where the gaze direction of the left eye of the user detected by the left-eye gaze tracking sensor and the gaze direction of the right eye of the user detected by the right-eye gaze tracking sensor converge, and obtain three-dimensional position coordinate information of the gaze point. The gaze tracking sensor 110 may provide the processor 130 with the three-dimensional position coordinate information of the gaze point.

The camera 120 is configured to obtain images of a real space and an object in the real space by photographing a space in the real world. In an embodiment of the disclosure, the camera 120 may be implemented in a small form factor to be mounted on the augmented reality device 100, and may be implemented as a lightweight RGB camera with a low power consumption. However, the disclosure is not limited thereto, and in an embodiment of the disclosure, the camera 120 may be implemented as any known type of camera, such as an RGB-depth camera having a depth estimation function, a dynamic vision sensor camera, a stereo fisheye camera, a grayscale camera, or an infrared camera.

The camera 120 may include a lens module, an image sensor, and an image processing module. The camera 120 may obtain a still image or a video of an object by using the image sensor (e.g., a complementary metal-oxide-semiconductor (CMOS) sensor or a charge-coupled device (CCD)). The image processing module may encode a still image consisting of a single image frame or video data consisting of a plurality of image frames obtained through the image sensor, and deliver a result of the encoding to the processor 130. In an embodiment of the disclosure, the camera 120 may obtain an image by photographing a payment code in a real space, and provide the obtained image to the processor 130.

In an embodiment of the disclosure, a plurality of cameras 120 may be provided. In a case in which the augmented reality device 100 is implemented as augmented reality glasses, a plurality of cameras 120 may be arranged, for example, on the frame, temple, or nose bridge of the augmented reality glasses. An exemplary detailed embodiment regarding the arrangement positions of the plurality of cameras 120 mounted on the augmented reality device 100 is described in detail with reference to FIG. 6A.

In an embodiment of the disclosure, the plurality of cameras 120 may have different optical characteristics, such as a zoom scale or a field of view.

The processor 130 may execute one or more instructions of a program stored in the memory 140. The processor 130 may include a hardware component configured to perform arithmetic operations, logic operations, input/output operations, and image processing. In FIG. 3, the processor 130 is illustrated as one element, but is not limited thereto. In an embodiment of the disclosure, the processor 130 may consist of one or more elements. The processor 130 may be general-purpose processors such as a CPU, an application processor (AP), or a digital signal processor (DSP), dedicated graphics processors such as a graphics processing unit (GPU) or a vision processing unit (VPU), or dedicated artificial intelligence processors such as a neural processing unit (NPU). The processor 130 may perform control to process input data according to predefined operation rules or an artificial intelligence model. In some embodiments, when the processor 130 is a dedicated artificial intelligence processor, the dedicated artificial intelligence processor may be designed with a hardware structure specialized for processing a particular artificial intelligence model.

The memory 140 may include, for example, at least one of a flash memory-type storage medium, a hard disk-type storage medium, a multimedia card micro-type storage medium, a card-type memory (e.g., Secure Digital (SD) or extreme Digital (XD) memory), random-access memory (RAM), static RAM (SRAM), read-only memory (ROM), electrically erasable programmable ROM (EEPROM), programmable ROM (PROM), a magnetic memory, a magnetic disc, or an optical disc.

The memory 140 may store instructions related to functions and/or operations, performed by the augmented reality device 100, of recognizing a payment code based on gaze information of a user and performing a payment process. In an embodiment of the disclosure, the memory 140 may store at least one of instructions, an algorithm, a data structure, program code, or an application program that is readable by the processor 130. The instructions, the algorithm, the data structure, and the program code stored in the memory 140 may be implemented in a programming or scripting language, for example, C, C++, Java, or an assembler.

The processor 130 may be implemented by executing instructions or program code stored in the memory 140.

The processor 130 may obtain, from the gaze tracking sensor 110, information about a gaze point where the gaze directions of both eyes of the user converge. In an embodiment of the disclosure, the user may gaze at a payment code, and in this case, the gaze point may be located at the payment code in a three-dimensional space. In the disclosure, the term 'payment code' refers to a sign code containing information for payment of a product or service, and may include, for example, a barcode or a QR code. The processor 130 may obtain, from the gaze tracking sensor 110, three-dimensional position coordinate information of the gaze point located on the payment code.

The processor 130 may obtain, from the camera 120, an image of the payment code at which the user is gazing, and obtain two-dimensional position coordinate information corresponding to the gaze point on the image. In an embodiment of the disclosure, the processor 130 may obtain two-dimensional position coordinates corresponding to the gaze point on a two-dimensional image obtained through the camera 120, by mapping the gaze point having three-dimensional position coordinates, to the two-dimensional image. In an embodiment of the disclosure, the processor 130 may obtain two-dimensional position coordinates of a point corresponding to the gaze point by mapping the gaze point in the three-dimensional space to the two-dimensional image based on at least one of the position where the camera 120 is arranged in the augmented reality device 100, or the field of view or intrinsic parameters of the camera 120. The intrinsic parameters of the camera may include, for example, information about the focal length and principal point of the camera 120.

The processor 130 may determine, as a region of interest, a region having a preset size centered on the two-dimensional position coordinates corresponding to the gaze point on the image. In an embodiment of the disclosure, the region of interest 30 may include an image region of the payment code 10.

In an embodiment of the disclosure, the camera 120 may include a plurality of cameras 120 having different zoom scales, and the processor 130 may select the camera 120 having the optimal zoom scale for recognizing the payment code from among the plurality of cameras 120, based on the distance between the gaze point and the user in the three-dimensional space. The processor 130 may determine a region of interest from an image obtained by photographing the payment code with the selected camera 120. In an embodiment of the disclosure, the processor 130 may select the camera 120 having a higher zoom scale when compared to a threshold or a highest zoom scale from among the plurality of cameras 120 in proportion to the distance between the gaze point and the user. Exemplary detailed embodiments in which the processor 130 selects one camera 120 from among the plurality of cameras 120 is described in detail with reference to FIGS. 5, 6A, and 6B.

In an embodiment of the disclosure, information about the physical size of the payment code may be obtained in advance and stored in the memory 140. The processor 130 may calculate the sizes of regions surrounding the payment code by projecting the payment code onto each of a plurality of images obtained through the plurality of cameras 120 based on the information about the size of the payment code, and select the camera 120 configured to obtain an image including the region with the largest calculated size, from among the plurality of cameras 120. The processor 130 may determine a region of interest from an image obtained through the selected camera 120. Exemplary embodiments in which the information about the physical size of a payment code is previously obtained, the processor 130 may determine one camera 120 from among the plurality of cameras 120 and determines a region of interest from an image obtained through the determined camera 120 are described in detail with reference to FIGS. 7 and 8.

The information about the physical size of the payment code may not be obtained in advance. In an embodiment of the disclosure in which information about the physical size of the payment code is not obtained, the processor 130 may obtain two-dimensional position coordinates corresponding to the gaze point from a plurality of images obtained through the plurality of cameras 120, recognize, from a region having a preset size, the presence or absence of the payment code and the size of a region occupied by the payment code based on the two-dimensional position coordinates of the gaze point, and select, from among the plurality of cameras 120, the camera 120 configured to obtain an image including a region having the largest size occupied by the payment code. The processor 130 may determine a region of interest from an image obtained through the selected camera 120. Exemplary embodiments in which information about the physical size of a payment code is not previously obtained, the processor 130 determines one camera 120 from among the plurality of cameras 120 and determines a region of interest from an image obtained through the determined camera 120 are described in detail with reference to FIGS. 9 and 10.

In an embodiment of the disclosure, in a case in which the camera 120 includes a plurality of cameras 120, the processor 130 may obtain a plurality of images by photographing a region corresponding to the gaze point with the plurality of cameras 120, obtain two-dimensional position coordinates corresponding to the gaze point from each of the plurality of obtained images, and determine, as a region of interest, a region having a preset size based on the obtained two-dimensional position coordinates. Exemplary embodiments in which the processor 130 determines a region of interest from each of a plurality of images obtained through the plurality of cameras 120 are described in detail with reference to FIGS. 11 and 12.

In an embodiment of the disclosure, in a case in which the camera 120 includes a plurality of cameras 120, the processor 130 may obtain a plurality of images by photographing a region corresponding to the gaze point with the plurality of cameras 120, and obtain a high-quality image with improved image quality parameters including at least one of a resolution, a contrast ratio, or noise by performing image processing using the plurality of obtained images. The processor 130 may determine, as a region of interest, a region having a preset size centered on the two-dimensional position coordinates corresponding to the gaze point on the high-quality image. A detailed embodiment in which the processor 130 obtains a high-quality image and determines a region of interest from the high-quality image will be described in detail with reference to FIG. 13.

The processor 130 may enlarge the region of interest to a preset zoom scale. In an embodiment of the disclosure, the processor 130 may enlarge the region of interest according to a plurality of preset zoom scales (n preset zoom scales). The processor 130 may enlarge an image corresponding to the region of interest by using a digital zoom method, or enlarge the image of the region of interest by using a digital zoom or optical zoom function of the camera 120.

The processor 130 may recognize the payment code from the enlarged image region. In an embodiment of the disclosure, the processor 130 may recognize the payment code from the enlarged image region by using known barcode detection or QR code detection technology.

When the payment code is recognized properly, the processor 130 may execute a payment application and perform a payment process by using the recognized payment code. In an embodiment of the disclosure, before performing the payment process, the processor 130 may output a user interface, such as a notification message for requesting payment approval, through the display unit 150. For example, the user interface may be implemented as a virtual object including a text or an image, and may be projected to a waveguide through an optical projector of the display unit 150 and thus displayed to the user.

When the payment code is not recognized properly, the processor 130 may determine whether the region of interest has been enlarged to the maximum zoom scale of the camera 120. When it is determined that the region of interest has been enlarged to the maximum zoom scale of the camera 120, the processor 130 may output, through the display unit 150, a user interface indicating a failure to recognize the payment code. When it is determined that the region of interest has not been enlarged to the maximum zoom scale of the camera 120, the processor 130 may increase the zoom scale of the camera 120 to enlarge the image corresponding to the region of interest. Thereafter, the processor 130 may recognize the payment code from the image region enlarged to the increased zoom scale.

The display unit 150 is configured to enlarge a region of interest in an image to display a payment code or a virtual object such as a user interface, under control of the processor 130. In a case in which the augmented reality device 100 is implemented as augmented reality glasses, the display unit 150 may be configured as a lens optical system and may include a waveguide and an optical engine. The optical engine may include a projector configured to generate light of a three-dimensional virtual object configured as a virtual image, and project the light to the waveguide. The optical engine may include, for example, an image panel imaging panel, an illumination optical system, a projection optical system, and the like. In an embodiment of the disclosure, the optical engine may be arranged in the frame or temples of the augmented reality glasses. In an embodiment of the disclosure, the optical engine may display a notification message by projecting, to the waveguide, light of a virtual object including of a notification message for providing information such as payment approval or a failure to recognize the payment code, under control of the processor 130.

However, the disclosure is not limited thereto, and the display unit 150 may include as at least one of a liquid-crystal display, a thin-film-transistor liquid-crystal display, an organic light-emitting diode display, a flexible display, a three-dimensional (3D) display, or an electrophoretic display.

Figure 5:
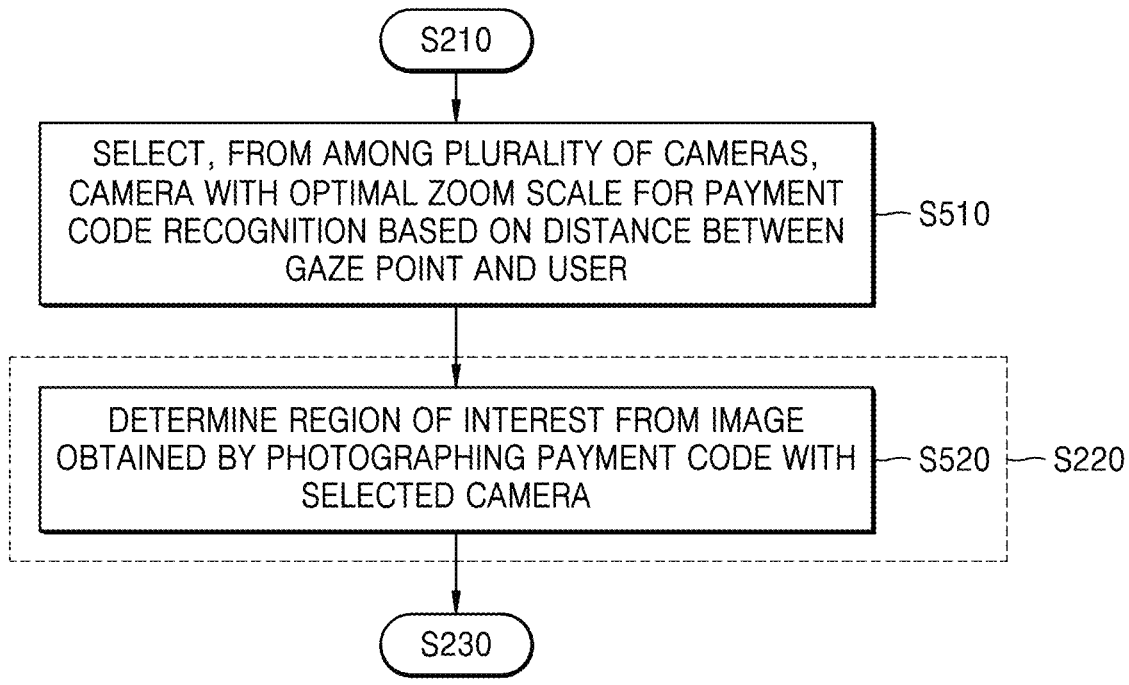
FIG. 5 is a flowchart of method in which an augmented reality device selects one camera from among a plurality of cameras, according to an embodiment of the disclosure.

FIG. 5 is a flowchart of an operation method, performed by the augmented reality device 100, of selecting one camera from among a plurality of cameras and obtaining an image, according to an embodiment of the disclosure.

Operation S520 of FIG. 5 is a detailed operation of operation S220 of FIG. 2. Operation S510 of FIG. 5 may be performed before or after operation S210 of FIG. 2 is performed. As an example, after operation S520 is performed, operation S230 of FIG. 2 may be performed.

Figure 6A:
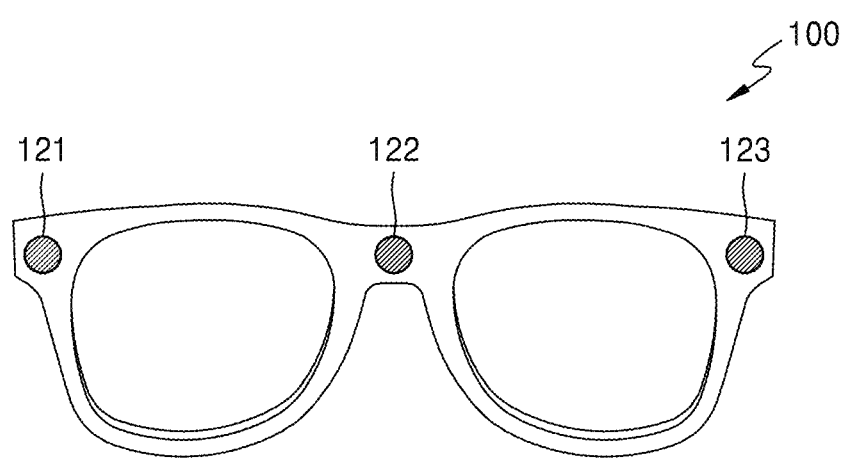
FIG. 6A is a diagram illustrating a plurality of cameras mounted on an augmented reality device, according to an embodiment of the disclosure.

FIG. 6A is a diagram illustrating a plurality of cameras 121, 122, and 123 mounted on the augmented reality device 100, according to an embodiment of the disclosure.

Figure 6B:
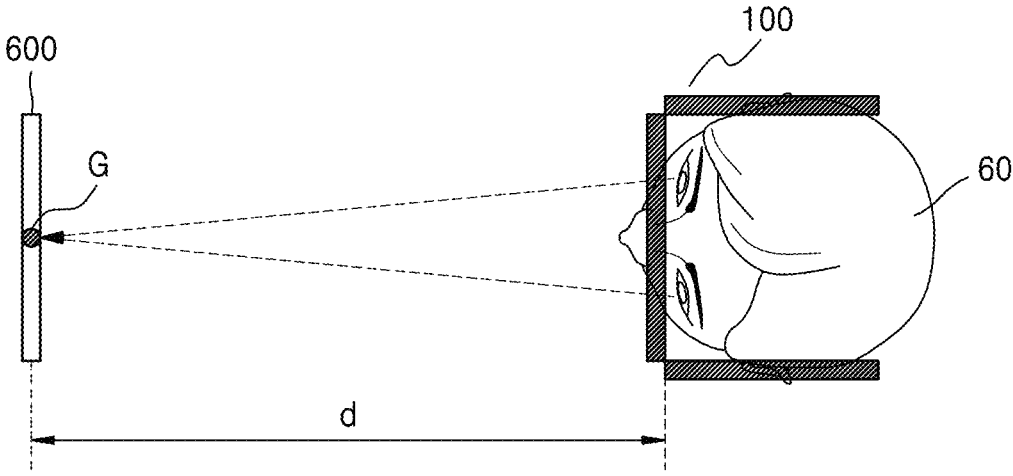
FIG. 6B is a diagram illustrating a method in which an augmented reality device selects one camera from among a plurality of cameras, according to an embodiment of the disclosure.

FIG. 6B is a diagram illustrating an operation, performed by the augmented reality device 100, of selecting any one of the plurality of cameras 121, 122, and 123 and obtaining an image, according to an embodiment of the disclosure.

Hereinafter, functions and/or operations of the augmented reality device 100 will be described with reference to FIGS. 5, 6A, and 6B together.

In operation S510 of FIG. 5, the augmented reality device 100 selects, from among the plurality of cameras, the camera with the optimal zoom scale for payment code recognition based on the distance between the gaze point and the user. Referring to FIG. 6A together, the augmented reality device 100 may include a plurality of cameras 121, 122, and 123. In the embodiment illustrated in FIG. 6A, among the plurality of cameras 121, 122, and 123, the first camera 121 may be arranged on the left temple of the augmented reality device 100 implemented as augmented reality glasses, the second camera 122 may be arranged on a nose bridge connecting the left lens frame and the right lens frame of the augmented reality device 100, and the third camera 123 may be arranged on the right temple of the augmented reality device 100. However, the positions and numbers of the plurality of cameras 121, 122, and 123 are only examples for convenience of description, and are not limited to those illustrated in FIG. 6A. The plurality of cameras 121, 122, and 123 may have different zoom scales. In an embodiment of the disclosure, the plurality of cameras 121, 122, and 123 may have different fields of view.

Referring to FIG. 6B, a user 60 may wear the augmented reality device 100 and then gaze at a payment code 600. The augmented reality device 100 may obtain information about the gaze directions of both eyes of the user 60 by using the gaze tracking sensor 110, and obtain three-dimensional position coordinate information of a gaze point G where the gaze directions of both eyes converge. The processor 130 of the augmented reality device 100 may obtain a distance d between the gaze point G and the user 60, from information about the gaze point G obtained through the gaze tracking sensor 110. In an embodiment of the disclosure, the processor 130 may obtain the distance d between the gaze point G and the user 60, based on the three-dimensional position coordinate information of the gaze point G, and the vergence distance between both eyes of the user 60.

The processor 130 of the augmented reality device 100 may select, from among the plurality of cameras 121, 122, and 123 (see FIG. 6A), the camera having an optimal zoom scale based on the distance d between the gaze point G and the user 60. In an embodiment of the disclosure, the processor 130 may select the camera having a higher zoom scale in proportion to the distance d between the gaze point G and the user 60. For example, the processor 130 may select, from among the plurality of cameras 121, 122, and 123, the camera having a higher zoom scale as the distance d between the gaze point G and the user 60 increases.

Referring again to FIG. 5, in operation S520, the augmented reality device 100 determines a region of interest from an image obtained by photographing the payment code with the selected camera. Referring to FIG. 6A together, for example, in a case in which the second camera 122 has the highest zoom scale among the plurality of cameras 121, 122, and 123, the augmented reality device 100 may select the second camera 122 and obtain an image by photographing, with the selected second camera 122, a region including the payment code where the gaze point G is located. The processor 130 of the augmented reality device 100 may obtain, from the obtained image, two-dimensional position coordinate information corresponding to the gaze point G, and determine, as a region of interest, a region having a preset size centered on the two-dimensional position coordinates.

Referring again to FIG. 5, in operation S230, the augmented reality device 100 enlarges the region of interest to a preset zoom scale. Operation S230 is the same as that described above with reference to FIG. 2, and thus, redundant descriptions will be omitted.

When the distance d between the payment code 600 and the user 60 is too far and the payment code 600 appears too small in images obtained through the plurality of cameras 121, 122, and 123, the recognition rate of the payment code may be low. In the embodiment illustrated in FIGS. 5, 6A, and 6B, in order to solve an issue of low recognition rate, the augmented reality device 100 may select, from among the plurality of cameras 121, 122, and 123, the camera having the highest zoom scale, and obtain an image by photographing the payment code 600 with the selected camera, thereby improving the recognition rate of the payment code 600.

Figure 7:
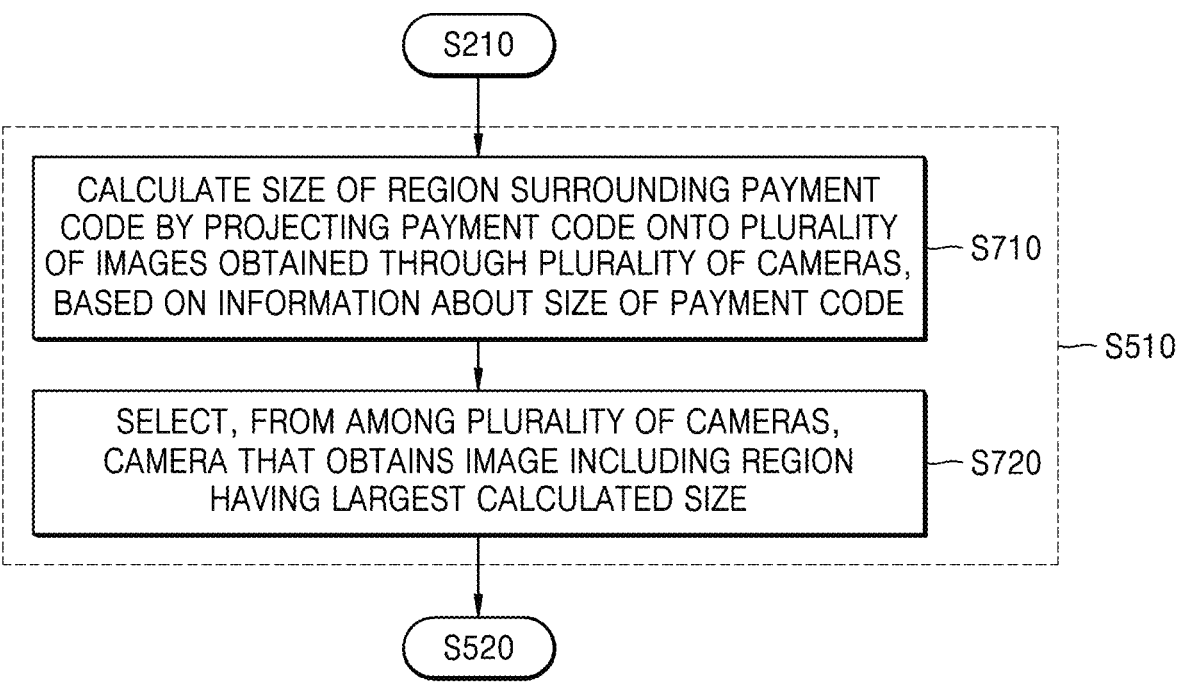
FIG. 7 is a flowchart a method in which an augmented reality device selects one camera from among a plurality of cameras, according to an embodiment of the disclosure.

FIG. 7 is a flowchart of an operation method, performed by the augmented reality device 100, in a case in which information about the size of a payment code is obtained in advance, of selecting any one of a plurality of cameras and obtaining an image, according to an embodiment of the disclosure.

Operations S710 and S720 of FIG. 7 are detailed operations of operation S510 of FIG. 5. Operation S710 of FIG. 7 may be performed before or after operation S210 of FIG. 2 is performed. As an example, after operation S720 of FIG. 7 is performed, operation S520 of FIG. 5 may be performed.

Figure 8:
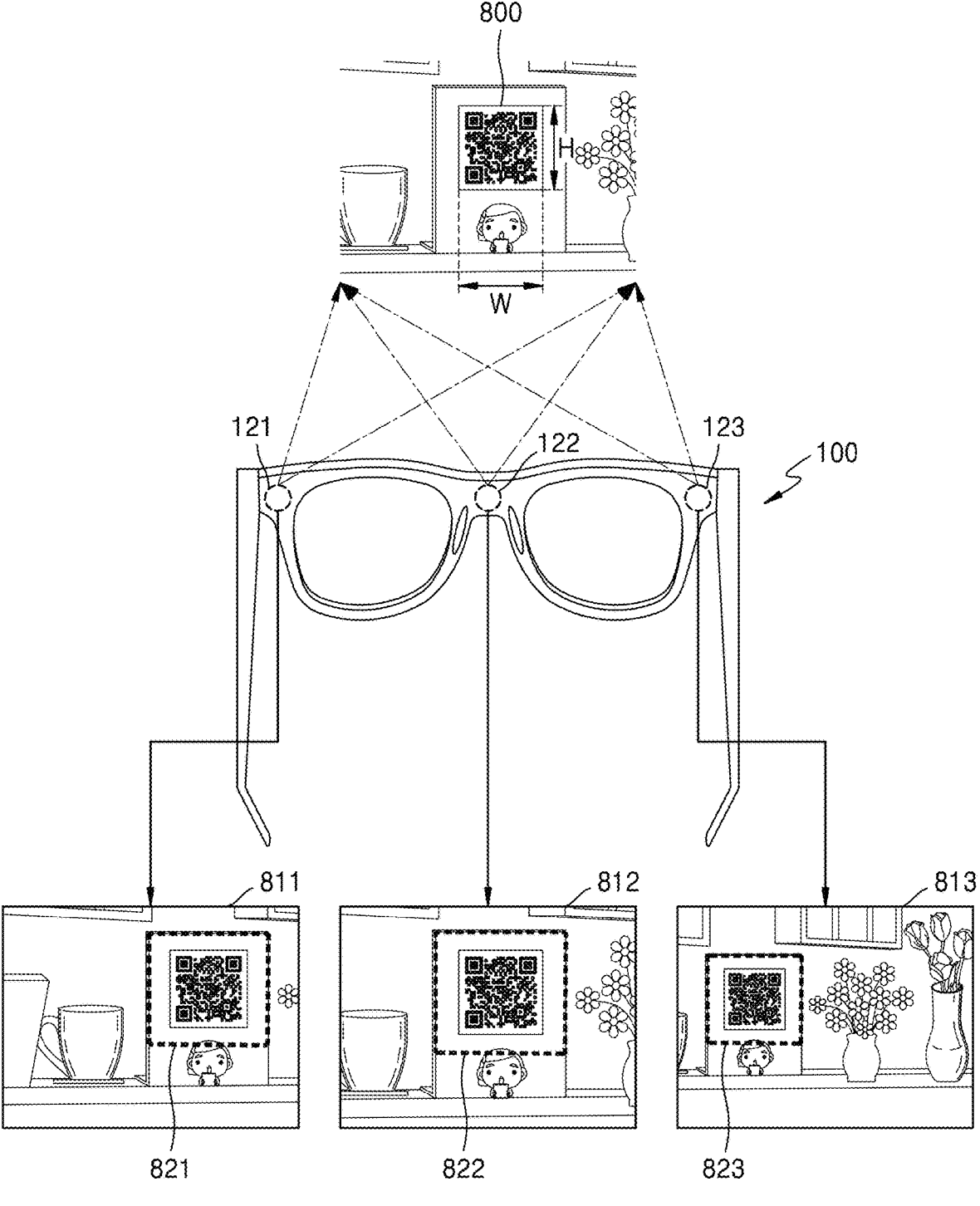
FIG. 8 is a diagram a method in which an augmented reality device selects one camera from among a plurality of cameras, according to an embodiment of the disclosure.

FIG. 8 is a diagram illustrating an operation, performed by the augmented reality device 100, in a case in which information about the size of a payment code 800 is obtained in advance, of selecting any one of a plurality of cameras 121, 122, and 123, and obtaining an image, according to an embodiment of the disclosure.

Hereinafter, functions and/or operations of the augmented reality device 100 will be described with reference to FIGS. 7 and 8 together.

In operation S710 of FIG. 7, the augmented reality device 100 calculates the size of a region surrounding the payment code by projecting the payment code onto a plurality of images obtained through a plurality of cameras, based on information about the size of the payment code. In an embodiment of the disclosure, information about the physical size of the payment code may be obtained in advance and stored in the memory 140 of the augmented reality device 100. Referring to FIG. 8 together, the physical size of the payment code 800, that is, a width W and a height H, may be obtained in advance and stored in the memory 140 of the augmented reality device 100. For example, the width W of the payment code 800 may be 10 cm and the height H of the payment code 800 may be 10 cm. However, this is an example and the size is not limited to the above size. In an embodiment of the disclosure, the augmented reality device 100 may include a plurality of cameras 121, 122, and 123. The positions and numbers of the plurality of cameras 121, 122, and 123 are the same as those illustrated in FIG. 6A, and thus, redundant descriptions will be omitted.

The processor 130 of the augmented reality device 100 may calculate the size of a region surrounding the payment code 800 by projecting the payment code 800 onto each of a plurality of images 811, 812, and 813 obtained through the plurality of cameras 121, 122, and 123, based on information about the size (W and H) of the payment code 800 pre-stored in the memory 140. In the embodiment illustrated in FIG. 8, the processor 130 may calculate the size of a first region 821 surrounding the payment code 800 from the first image 811 obtained through the first camera 121. Similarly, the processor 130 may calculate the size of a second region 822 surrounding the payment code 800 from the second image 812 obtained through the second camera 122, and calculate the size of a third region 823 surrounding the payment code 800 from the third image 813 obtained through the third camera 123.

Referring again to FIG. 7, in operation S720, the augmented reality device 100 selects, from among the plurality of cameras, the camera that obtains an image including the region having the largest calculated size. In the embodiment illustrated in FIG. 8, among the regions 821, 822, and 823 surrounding the payment code 800 on the plurality of images 811, 812, and 813 obtained through the plurality of cameras 121, 122, and 123, respectively, the second region 822 may have the largest area. The processor 130 of the augmented reality device 100 may select, from among the plurality of cameras 121, 122, and 123, the second camera 122 that captures the second image 812 including the second region 822 having the largest area among the regions 821, 822, and 823 surrounding the payment code 800.

Referring to FIG. 7, in operation S520, the augmented reality device 100 may obtain two-dimensional position coordinates corresponding to the gaze point from the second image 812 obtained by photographing the payment code 800 with the selected second camera 122, and determine, as a region of interest, a region having a preset size based on the two-dimensional position coordinates.

In the embodiments illustrated in FIGS. 7 and 8, when the physical size (W and H) of the payment code 800 is previously obtained, the augmented reality device 100 may calculate the size of a region surrounding the payment code 800 by projecting the payment code 800 onto the plurality of images 811, 822, and 823 obtained through the plurality of cameras 121, 122, and 123 by using the physical sizes (W and H) of the payment code 800, and select the camera that captures the image having the largest calculated size. As such, in a case in which the plurality of cameras 121, 122, and 123 have different zoom scales or fields of view, the augmented reality device 100 according to an embodiment of the disclosure may select the camera capable of capturing an image in which the payment code 800 appears the largest, thereby improving the recognition rate of the payment code 800.

Figure 9:
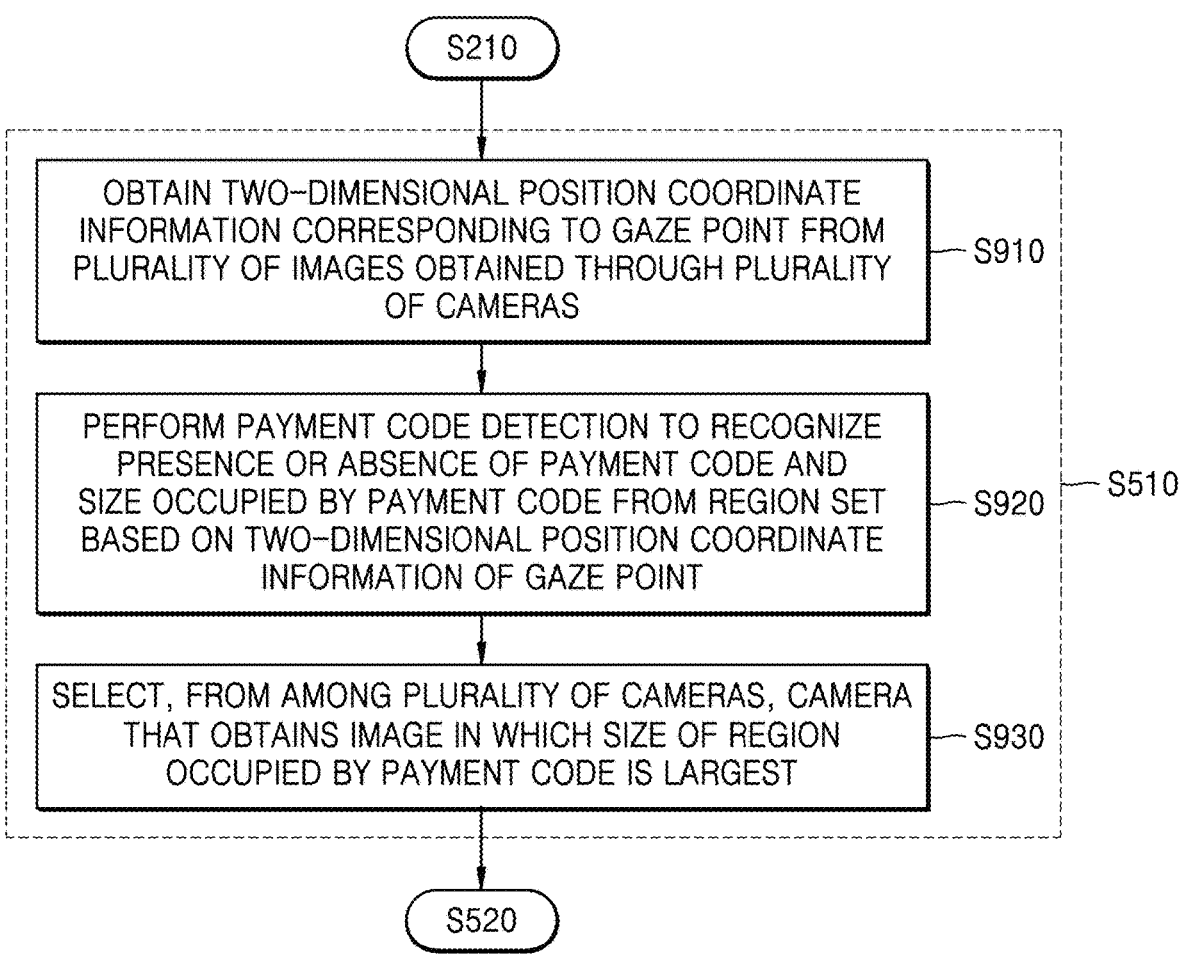
FIG. 9 is a flowchart of a method in which an augmented reality device selects one camera from among a plurality of cameras, according to an embodiment of the disclosure.

FIG. 9 is a flowchart of an operation method, performed by the augmented reality device 100, of selecting any one of a plurality of cameras based on the sizes of regions occupied by a payment code in images, and obtaining an image, according to an embodiment of the disclosure.

Operations S910 to S920 of FIG. 9 are detailed operations of operation S510 of FIG. 5. Operation S910 of FIG. 9 may be performed before or after operation S210 of FIG. 2 is performed. After operation S930 of FIG. 9 is performed, operation S520 of FIG. 5 may be performed.

Figure 10:
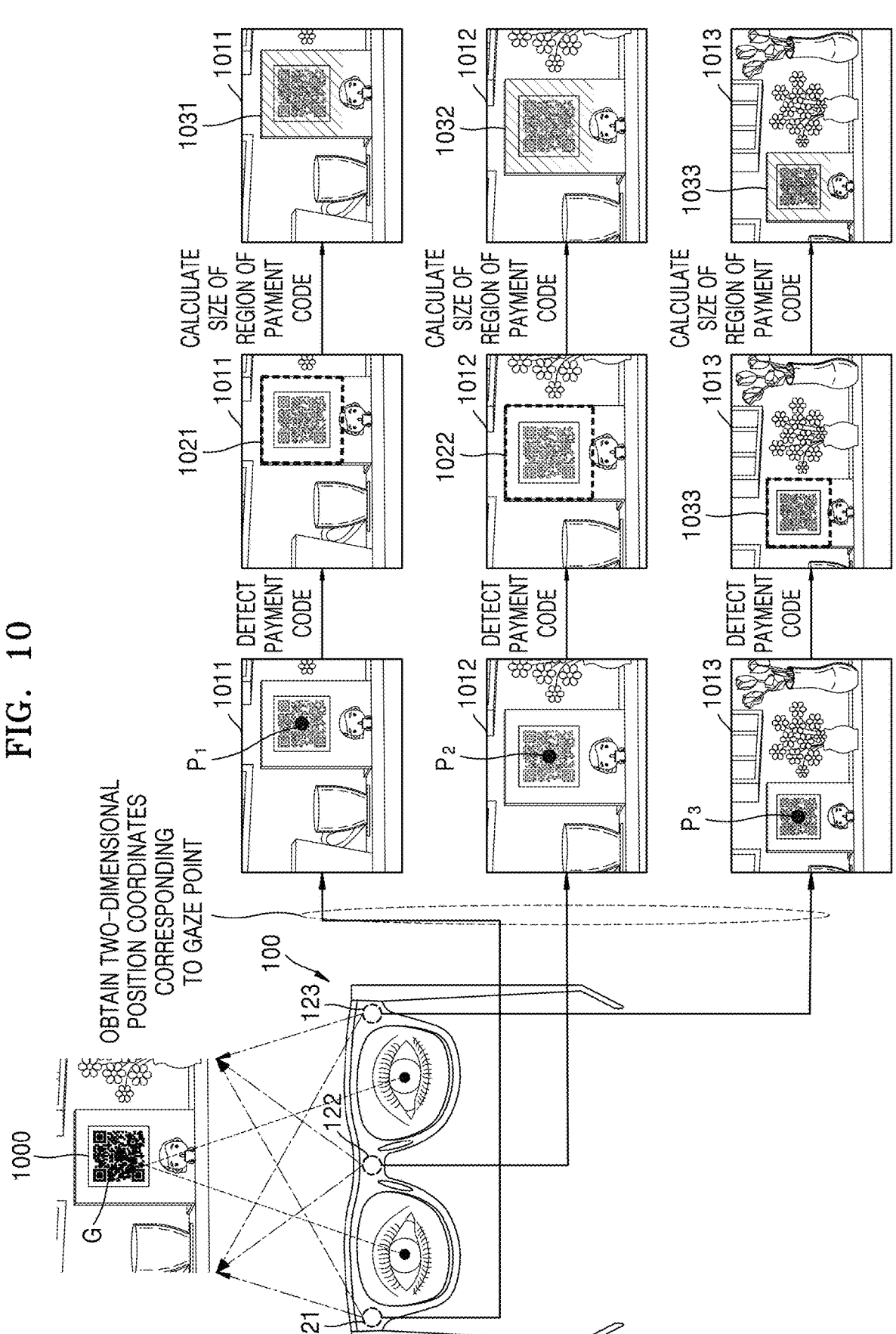
FIG. 10 a diagram illustrating method in which an augmented reality device selects one camera from among a plurality of cameras, according to an embodiment of the disclosure.

FIG. 10 a diagram illustrating an operation, performed by the augmented reality device 100, of selecting any one of a plurality of cameras 121, 122, and 123 based on the sizes of regions occupied by a payment code 1000 in images 1011, 1012, and 1013, and obtaining an image, according to an embodiment of the disclosure.

Hereinafter, functions and/or operations of the augmented reality device 100 will be described with reference to FIGS. 9 and 10 together.

Referring to FIG. 9, in operation S910, the augmented reality device 100 obtains two-dimensional position coordinate information corresponding to the gaze point from a plurality of images obtained through a plurality of cameras. Referring to FIG. 10 together, the augmented reality device 100 may obtain gaze direction information of both eyes of the user gazing at the payment code 1000 by using the gaze tracking sensor 110, and obtain three-dimensional position coordinates of a gaze point G where the gaze directions of both eyes converge. In an embodiment of the disclosure, the augmented reality device 100 may include a plurality of cameras 121, 122, and 123. The positions and numbers of the plurality of cameras 121, 122, and 123 are the same as those illustrated in FIG. 6A, and thus, redundant descriptions will be omitted. The augmented reality device 100 may obtain a plurality of images 1011, 1012, and 1013 by photographing the position at which the user is gazing, that is, a region including the payment code 1000, through the plurality of cameras 121, 122, and 123.

The processor 130 of the augmented reality device 100 may identify points $P_1$, $P_2$, and $P_3$ corresponding to the gaze point G respectively from the plurality of images 1011, 1012, and 1013, and obtain two-dimensional position coordinates of the points $P_1$, $P_2$, and $P_3$. In an embodiment of the disclosure, the processor 130 may obtain the two-dimensional position coordinates of the points $P_1$, $P_2$, and $P_3$ corresponding to the gaze point G by mapping the gaze point G in the three-dimensional space to the two-dimensional images 1011, 1012, and 1013 based on at least one of the position, field of view, or intrinsic parameters of each of the plurality of cameras 121, 122, and 123. The intrinsic parameters of each of the plurality of cameras 121, 122, and 123 may include, for example, information about the focal length and principal point of the camera.

Referring again to FIG. 9, in operation S920, the augmented reality device 100 performs payment code detection to recognize the presence or absence of the payment code and the size occupied by the payment code from a region set based on the two-dimensional position coordinate information of the gaze point. Referring to FIG. 10 together, from the plurality of images 1011, 1012, and 1013, the processor 130 of the augmented reality device 100 may detect the payment code 1000 from detection regions 1021, 1022, and 1023 having preset sizes centered on the two-dimensional position coordinates of the points $P_1$, $P_2$, and $P_3$ corresponding to the gaze point G. In an embodiment of the disclosure, the processor 130 may perform barcode detection or QR code detection to recognize the presence or absence of the payment code 1000 and the sizes of regions 1031, 1032, and 1033 occupied by the payment code 1000, from the detection region 1021, 1022, and 1023 determined within the plurality of images 1011, 1012, and 1013.

In the embodiment illustrated in FIG. 10, the processor 130 may recognize the presence or absence of the payment code 1000 and the size of the region 1031 occupied by the payment code 1000, from the first detection area 1021 having a preset size centered on the two-dimensional position coordinates of the first point $P_1$ corresponding to the gaze point G on the first image 1011. Similarly, the processor 130 may recognize the presence or absence of the payment code 1000 and the size of the region 1032 occupied by the payment code 1000, from the second detection area 1022 having a preset size centered on the two-dimensional position coordinates of the second point $P_2$ on the second image 1012, and recognize the presence or absence of the payment code 1000 and the size of the region 1033 occupied by the payment code 1000, from the third detection area 1023 having a preset size centered on the two-dimensional position coordinates of the third point $P_3$ on the third image 1013.

In operation S930 of FIG. 9, when the payment code is present, the augmented reality device 100 selects, from among the plurality of cameras, the camera that obtains an image in which the size of the region occupied by the payment code is the largest. Referring to FIG. 10 together, when the payment code 1000 is detected in the payment code detection, the processor 130 of the augmented reality device 100 may select the image in which the size of the region occupied by the payment code 1000 is the largest, and select the camera that captures the selected image from among the plurality of cameras 121, 122, and 123. For example, in a case in which, among the sizes of the regions 1031, 1032, and 1033 occupied by the payment code 1000 in the plurality of images 1011, 1012, and 1013, the size of the occupied region 1032 in the second image 1012 is the largest, the processor 130 may select the second camera 122 configured to capture the second image 1012 from among the plurality of cameras 121, 122, and 123.

Referring again to FIG. 9, in operation S520, the augmented reality device 100 may obtain two-dimensional position coordinates corresponding to the gaze point from the second image 1012 obtained by photographing the payment code 1000 with the selected second camera 122, and determine, as a region of interest, a region having a preset size based on the two-dimensional position coordinates.

In the embodiment illustrated in FIGS. 9 and 10, in a case in which the physical size of the payment code 1000 is not previously obtained, the augmented reality device 100 may identify, from among the plurality of images 1011, 1012, and 1013 obtained by using the plurality of cameras 121, 122, and 123, the image (e.g., the second image 1022) in which the presence of the payment code 1000 is recognized and the size of the region 1031, 1032, or 1033 occupied by the payment code 1000 is the largest, and select, from among the plurality of cameras 121, 122, and 123, the second camera 122 configured to capture the identified image. As such, in a case in which the plurality of cameras 121, 122, and 123 have different zoom scales or fields of view, the augmented reality device 100 according to an embodiment of the disclosure may select the camera capable of capturing an image in which the payment code 1000 appears the largest, thereby improving the recognition rate of the payment code 1000.

Figure 11:
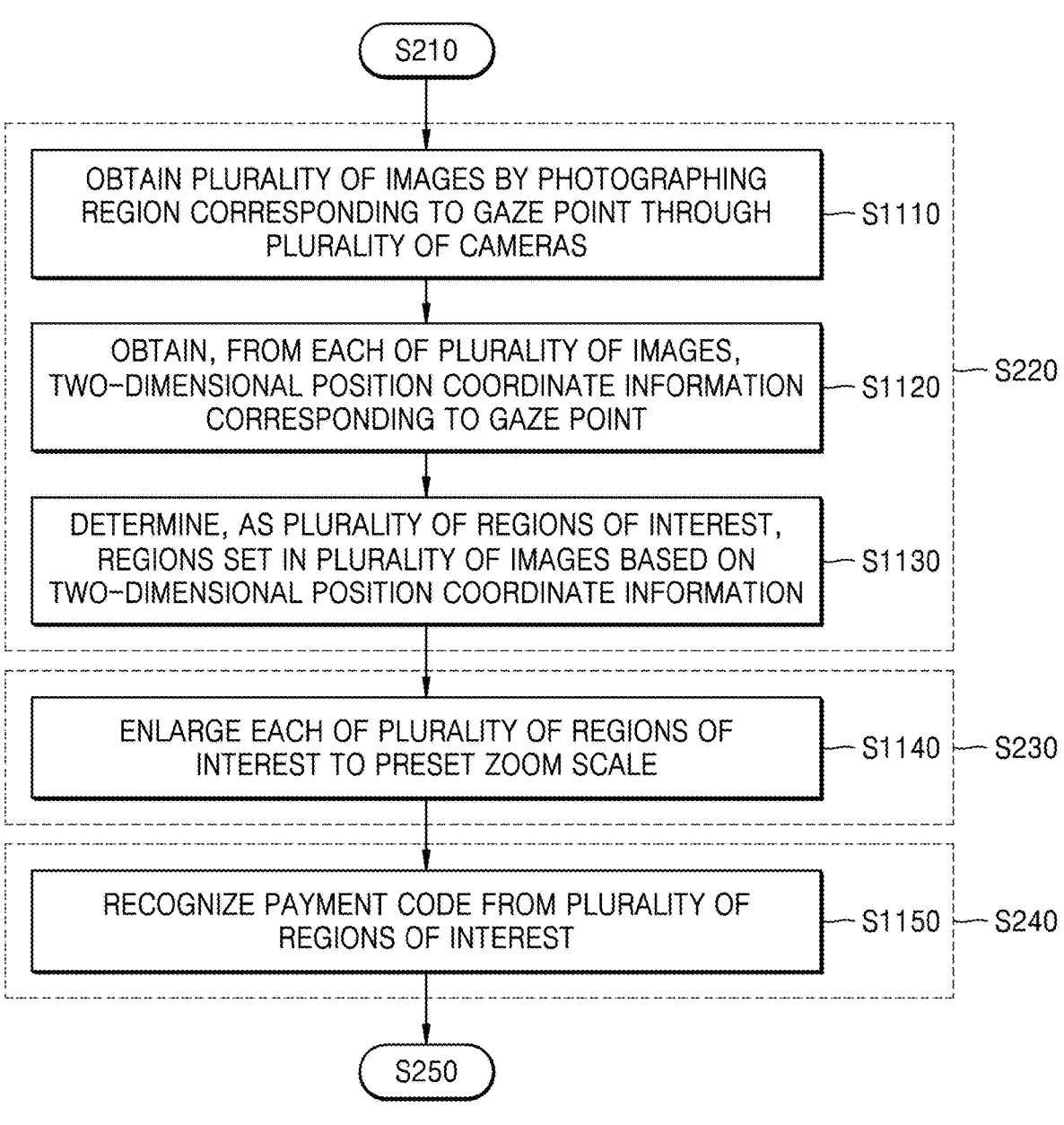
FIG. 11 is a flowchart of a method in which an augmented reality device recognizes a payment code, according to an embodiment of the disclosure.

FIG. 11 is a flowchart of an operation method, performed by the augmented reality device 100, of recognizing a payment code from a plurality of images obtained by using a plurality of cameras, according to an embodiment of the disclosure.

Operations S1110 to S1130 of FIG. 11 are detailed operations of operation S220 of FIG. 2. Operation S1110 of FIG. 11 may be performed before or after operation S210 of FIG. 2 is performed. Operation S1140 of FIG. 11 is a detailed operation of operation S230 of FIG. 2. Operation S1150 of FIG. 11 is a detailed operation of operation S240 of FIG. 2. After operation S1150 of FIG. 11 is performed, operation S250 of FIG. 2 may be performed.

In operation S1110, the augmented reality device 100 obtains a plurality of images by photographing a region corresponding to the gaze point through a plurality of cameras. In an embodiment of the disclosure, the augmented reality device 100 may obtain the plurality of images by photographing, with the plurality of cameras 121, 122, and 123, a region including the payment code in a real space at which the user is gazing.

In operation S1120, the augmented reality device 100 obtains, from each of the plurality of images, two-dimensional position coordinate information corresponding to the gaze point. The augmented reality device 100 may identify a point corresponding to the gaze point from each of the plurality of images, and obtain two-dimensional position coordinates of the identified point. In an embodiment of the disclosure, the augmented reality device 100 may obtain the two-dimensional position coordinates of the points corresponding to the gaze point by mapping the gaze point in the three-dimensional space to the plurality of images based on at least one of the mounting positions, fields of view, or intrinsic parameters of the plurality of cameras.

In operation S1130, the augmented reality device 100 determines, as a plurality of regions of interest, regions set in the plurality of images based on the two-dimensional position coordinate information. In an embodiment of the disclosure, the augmented reality device 100 may determine, as the regions of interest, regions having preset sizes centered on the two-dimensional position coordinates of the points corresponding to the gaze point in the plurality of images.

In operation S1140, the augmented reality device 100 enlarges each of the plurality of regions of interest to a preset zoom scale. In an embodiment of the disclosure, the augmented reality device 100 may enlarge the plurality of regions of interest by using a digital zoom or optical zoom function of the plurality of cameras.

In operation S1150, the augmented reality device 100 recognizes the payment code from the plurality of regions of interest.

In the embodiment of FIG. 11, the augmented reality device 100 may simultaneously determine the plurality of regions of interest from the plurality of images obtained by using the plurality of cameras, simultaneously enlarge the plurality of regions of interest, and simultaneously recognize the payment code from the plurality of regions of interest. However, the disclosure is not limited thereto, and in an embodiment of the disclosure, the augmented reality device 100 may sequentially obtain images by using the plurality of cameras, respectively, determine regions of interest from the sequentially obtained images, and enlarge the regions of interest to recognize the payment code. An embodiment of the disclosure in which the augmented reality device 100 sequentially recognizes a payment code from a plurality of images will be described in detail with reference to FIG. 12.

FIG. 12 is a flowchart of an operation method, performed by the augmented reality device 100, of recognizing a payment code from a plurality of images obtained by using a plurality of cameras, and performing a payment process, according to an embodiment of the disclosure.

In operation S1210, the augmented reality device 100 selects the k-th camera from among n cameras that photograph a region corresponding to a gaze point. In an embodiment of the disclosure, the augmented reality device 100 may include a plurality of cameras (n cameras). For example, n may be 3, but is not limited thereto. The augmented reality device 100 may include two or more cameras. The augmented reality device 100 may select the k-th camera from among the n cameras. Here, k is a value between 1 and n.

In operation S1220, the augmented reality device 100 determines a region of interest based on two-dimensional position coordinates corresponding to the gaze point on an image obtained through the k-th camera. In an embodiment of the disclosure, the augmented reality device 100 may identify a point mapped to the gaze point in a three-dimensional space from the image obtained through the k-th camera among the n cameras, and obtain two-dimensional position coordinates of the identified point. The augmented reality device 100 may determine, as the region of interest, a region having a preset size centered on the two-dimensional position coordinates corresponding to the gaze point.

In operation S1230, the augmented reality device 100 enlarges the determined region of interest to a preset zoom scale. In an embodiment of the disclosure, the augmented reality device 100 may enlarge the region of interest by using a digital zoom or optical zoom function of the k-th cameras.

In operation S1240, the augmented reality device 100 may determine whether a payment code is recognized in the enlarged image region. In an embodiment of the disclosure, the augmented reality device 100 may perform barcode detection or QR code detection to determine whether a payment code is recognized from the enlarged image region.

In case that the payment code is determined to be recognized (operation S1250), the augmented reality device 100 outputs a user interface for requesting payment approval.

In operation S1260, the augmented reality device 100 executes a payment application and performs a payment process using the payment code.

In case that the payment code is determined not to be recognized properly, e.g., in operation S1270, the augmented reality device 100 determines whether k is equal to n. In an embodiment of the disclosure, when it is determined that the payment code has not been recognized properly, the augmented reality device 100 may enlarge the region of interest again by increasing the zoom scale of the image obtained by the k-th camera. In case that the payment code is not recognized even through the re-enlargement, the augmented reality device 100 may determine whether k is equal to n or whether k is less than n.

When k is equal to n, e.g., in operation S1280, the augmented reality device 100 outputs a user interface indicating a failure to recognize the payment code. For example, the augmented reality device 100 may output a notification message indicating a payment failure, such as "Payment was declined because the barcode (or QR code) was not recognized".

When k is not equal to n, e.g., in operation S1290, the augmented reality device 100 may increase the camera index. In an embodiment of the disclosure, the augmented reality device 100 may increase k by 1 to select the (k+1)-th camera. The augmented reality device 100 may perform operations S1210 to S1270 again by using the (k+1)-th camera. For example, the augmented reality device 100 may repeatedly perform selecting the (k+1)-th camera (e.g., in S1210), determining a region of interest on an image obtained by using the (k+1)-th camera (e.g., in S1220), enlarging the determined region of interest to a preset zoom scale (e.g., in S1230), determining whether the payment code is recognized (e.g., in S1240), and executing the payment application to perform the payment process according to a result of the determining (e.g., in S1260) or comparing (k+1) with n (e.g., in S1270). When (k+1) is equal to n (e.g., in S1280), the augmented reality device 100 may output a notification message indicating a failure to recognize the payment code. When (k+1) is not equal to n (e.g., in S1290), the augmented reality device 100 may increase the camera index by 1, i.e., from (k+1) to (k+2).

In the embodiment illustrated in FIGS. 11 and 12, the augmented reality device 100 determines a region of interest from a plurality of images obtained through a plurality of cameras, enlarges the regions of interest to recognize a payment code, thereby improving the recognition rate and accuracy of the payment code.

Figure 13:
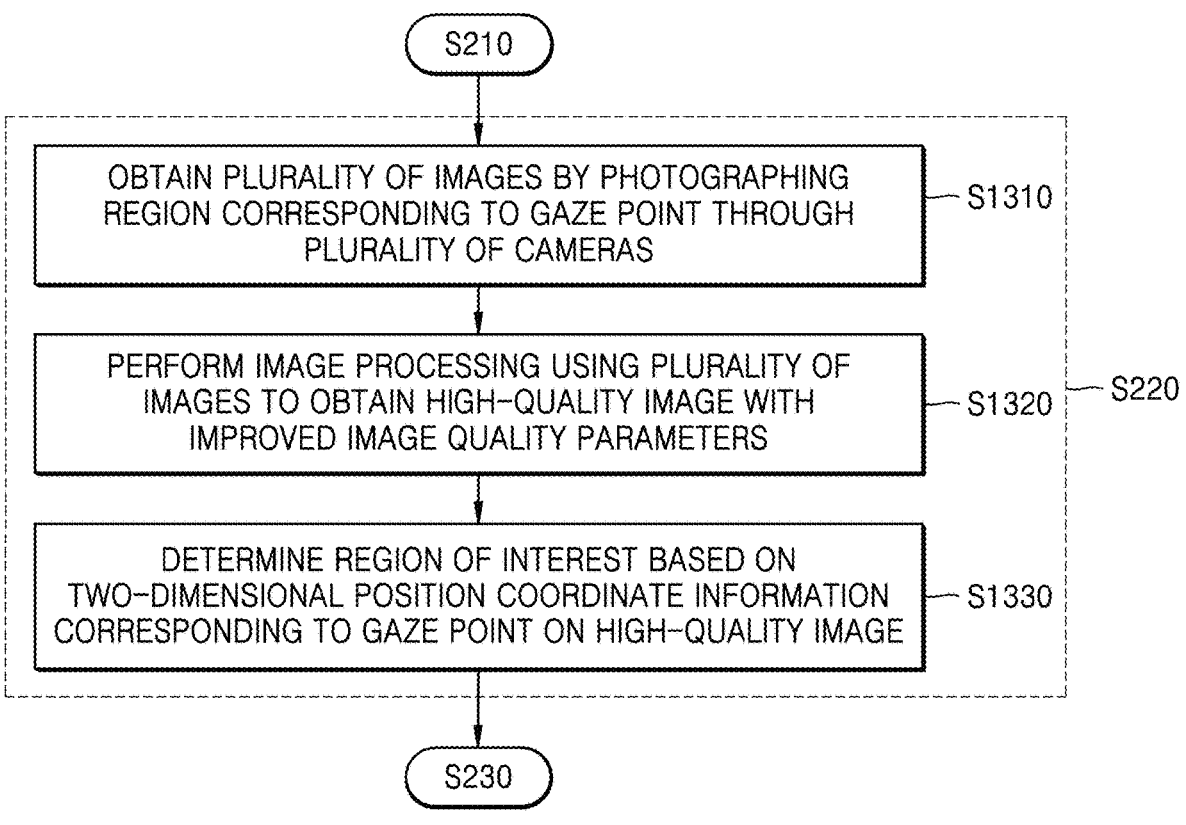
FIG. 13 is a flowchart of a method in which an augmented reality device determines a region of interest, according to an embodiment of the disclosure.

FIG. 13 is a flowchart of an operation method, performed by the augmented reality device 100, of obtaining a high-quality image and determines a region of interest from the high-quality image, according to an embodiment of the disclosure.

Operations S1310 to S1330 of FIG. 13 are detailed operations of operation S220 of FIG. 2. Operation S1310 of FIG. 13 may be performed before or after operation S210 of FIG. 2 is performed. As an example, after operation S1330 of FIG. 13 is performed, operation S230 of FIG. 2 may be performed.

In operation S1310, the augmented reality device 100 obtains a plurality of images by photographing a region corresponding to a gaze point through a plurality of cameras. Operation S1310 is the same as operation S1110 of FIG. 11, and thus, redundant descriptions will be omitted.

In operation S1320, the augmented reality device 100 performs image processing using the plurality of images to obtain a high-quality image with improved image quality parameters. In an embodiment of the disclosure, the processor 130 of the augmented reality device 100 may obtain a high-quality image by performing up-scaling, such as super resolution, using a plurality of images. In addition, in an embodiment of the disclosure, the processor 130 may obtain a high-quality image by performing image processing such as noise removal or contrast adjustment (e.g., auto contrast) by using a plurality of images to correct the quality of an image. Up-scaling, noise removal, contrast adjustment, and the like are known image quality improvement techniques, and thus, detailed descriptions thereof will be omitted. In an embodiment of the disclosure, the processor 130 may obtain a high-quality image by using all known image processing techniques that use a plurality of images, in addition to the above-described techniques.

In operation S1330, the augmented reality device 100 determines a region of interest based on two-dimensional position coordinate information corresponding to the gaze point on the high-quality image. In an embodiment of the disclosure, the augmented reality device 100 may obtain, from the high-quality image, two-dimensional position coordinates corresponding to the gaze point in a three-dimensional space, and determine, as a region of interest, a region having a preset size based on the two-dimensional position coordinates. Operation S1330 is the same as operation S220 of FIG. 2 except that the region of interest is determined from the high-quality image, and thus, redundant descriptions will be omitted.

In the embodiment illustrated in FIG. 13, the augmented reality device 100 may obtain a high-quality image by using a plurality of images obtained through a plurality of cameras, determine a region of interest from the high-quality image, and recognize a payment code by enlarging the region of interest to a preset zoom scale. The augmented reality device 100 according to an embodiment of the disclosure recognizes a payment code from a high-quality image, thereby improving the recognition rate and accuracy of the payment code.

Figure 14:
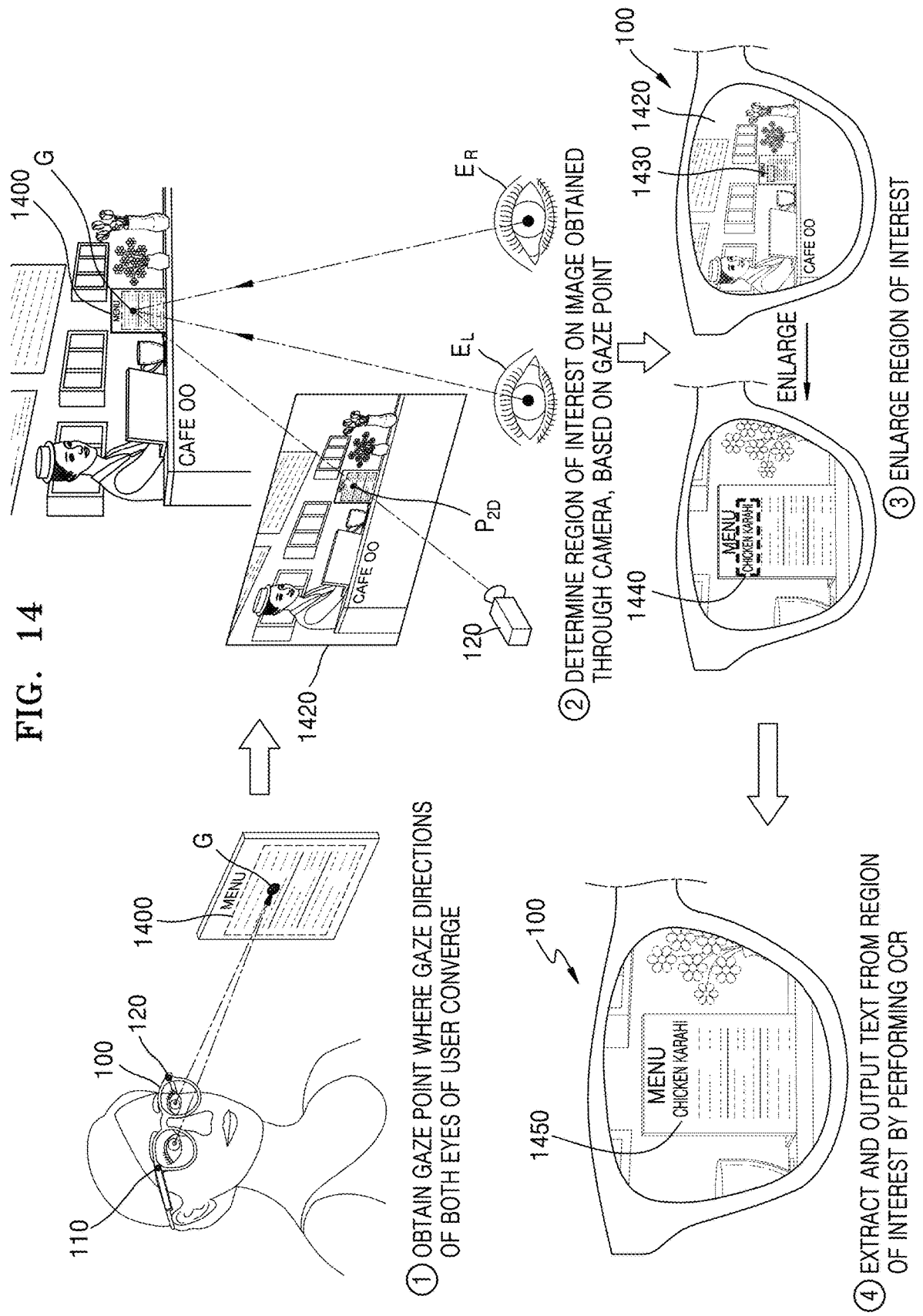
FIG. 14 is a diagram illustrating a method in which an augmented reality device recognizes a text, according to an embodiment of the disclosure.

FIG. 14 is a diagram illustrating an operation, performed by the augmented reality device 100, of recognizing a text by using gaze direction information of a user, enlarging the text, and displaying the enlarged text, according to an embodiment of the disclosure.

Referring to FIG. 14, the augmented reality device 100 may include at least one gaze tracking sensor 110 and a camera 120. The augmented reality device 100 obtains gaze information of both eyes of the user by using the at least one gaze tracking sensor 110, and obtains a gaze point G where the gaze directions of both eyes of the user converge in a three-dimensional space, based on the obtained gaze information. This is illustrated in operation 1 in FIG. 14.

The augmented reality device 100 determines a region of interest 1430 on an image 1420 obtained through the camera 120, based on the gaze point G. This is illustrated in operation 2 in FIG. 14.

The augmented reality device 100 enlarges the region of interest 1430. This is illustrated in operation 3 in FIG. 14.

The augmented reality device 100 recognizes a menu 1400 from an enlarged region of interest 1440 of the image 1420, extracts a text from the menu 1400 by performing optical character recognition (OCR), and outputs the extracted text. This is illustrated in operation 4 in FIG. 14.

Hereinafter, detailed functions and/or operations of the augmented reality device 100 will be described in detail with reference to the embodiment illustrated in FIG. 14 together with FIG. 15.

Figure 15:
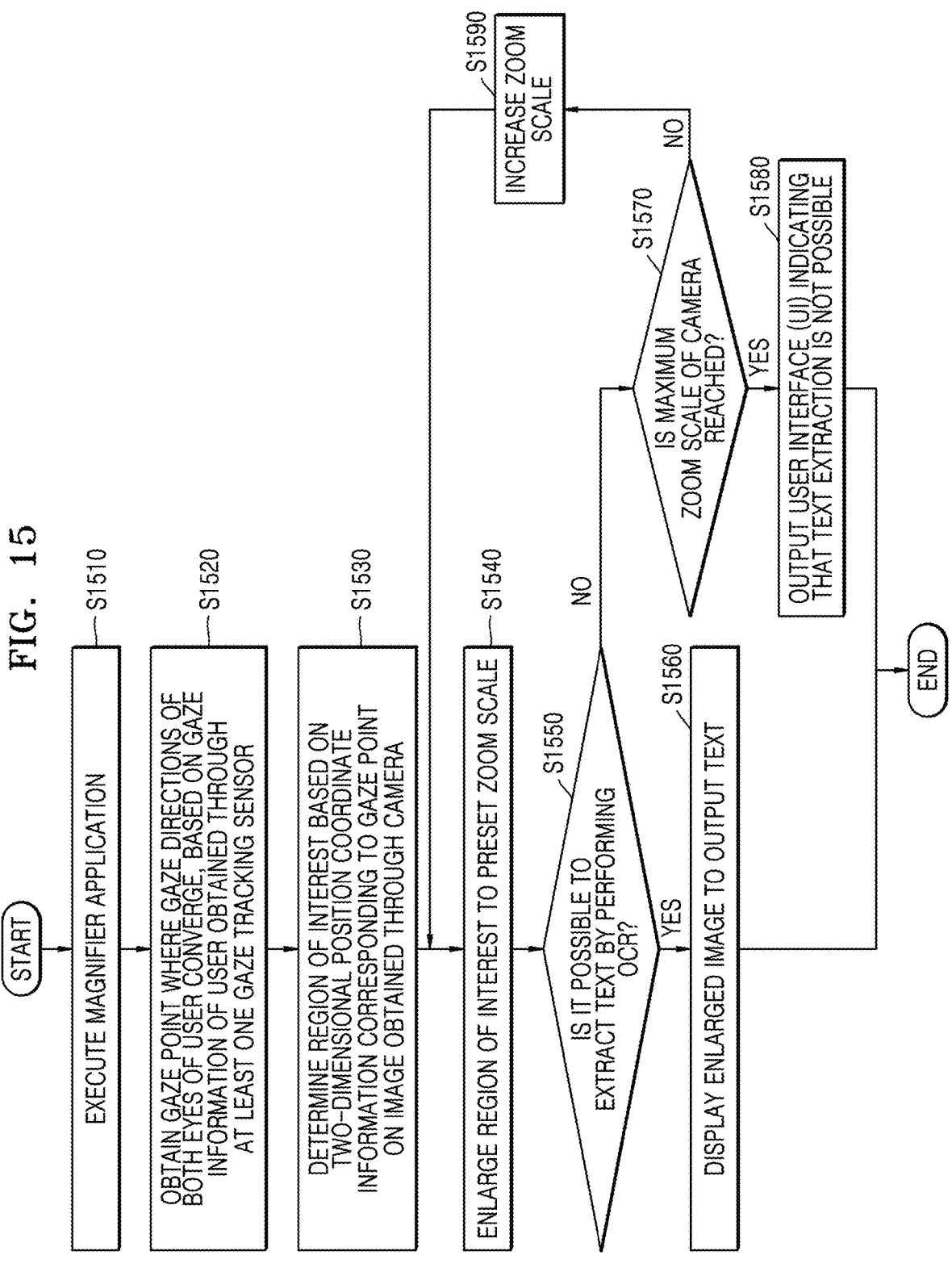
FIG. 15 is a flowchart of a method in which an augmented reality device recognizes a text, according to an embodiment of the disclosure.

FIG. 15 is a flowchart of an operation method, performed by the augmented reality device 100, of recognizing a text by using gaze direction information of a user, enlarging the text, and displaying the enlarged text, according to an embodiment of the disclosure.

Referring to FIG. 15, in operation S1510, the augmented reality device 100 executes a magnifier application. In the disclosure, the 'magnifier application' refers to an augmented reality application for capturing an image of a region at which a user is gazing in a real space by using the camera 120, enlarging the region in the captured image, and displaying the enlarged region. In an embodiment of the disclosure, the augmented reality device 100 may output a virtual object configured as a graphical user interface for executing the magnifier application, recognize a hand pointing input of the user for selecting the output virtual object, and execute the magnifier application. However, the disclosure is not limited thereto, and the augmented reality device 100 may receive a voice input from the user for instructing to execute of the magnifier application, and execute the magnifier application as the voice input is received.

In operation S1520, the augmented reality device 100 obtains a gaze point where the gaze directions of both eyes of the user converge in a three-dimensional space, based on gaze information of the user obtained through at least one gaze tracking sensor. In an embodiment of the disclosure, the augmented reality device 100 may include a left-eye gaze tracking sensor configured to detect the gaze direction of the left eye of the user, and a right-eye gaze tracking sensor configured to detect the gaze direction of the right eye of the user. Detecting a gaze direction of the user may include obtaining gaze information related to a gaze of the user. In combination with operation 1 of FIG. 14 the gaze tracking sensor 110 may include a left-eye gaze tracking sensor and a right-eye gaze tracking sensor. The augmented reality device 100 may obtain information about the gaze direction of the left eye of the user through the left-eye gaze tracking sensor, and obtain information about the gaze direction of the right eye of the user through the right-eye gaze tracking sensor. The augmented reality device 100 may detect the gaze point G where the obtained gaze direction of the left eye of the user and the gaze direction of the right eye of the user converge, and obtain three-dimensional position coordinate information of the gaze point G. In the embodiment illustrated in FIG. 14, the user is gazing at the menu 1400 of a restaurant or cafe in a real space, and the gaze point G may be located on the menu 1400.

In operation S1530, the augmented reality device 100 determines a region of interest based on two-dimensional position coordinate information corresponding to the gaze point on an image obtained through the camera. In combination with operation 2 of FIG. 14 the augmented reality device 100 may obtain the image 1420 by using the camera 120 to photograph a region at which the user is gazing, that is, a region corresponding to the gaze point G. A detail method in operation S1530 of obtaining, from the image 1420, two-dimensional position coordinate information of the point $P_{2D}$ corresponding to the gaze point G in the three-dimensional space, may be the same as operation 2 of FIG. 1 and operation S220 of FIG. 2, and thus, redundant descriptions will be omitted. The augmented reality device 100 may determine, as the region of interest 1430, a region in the image 1420 having a preset size centered on the obtained two-dimensional position coordinates of the point $P_{2D}$. In the embodiment illustrated in FIG. 14, the region of interest 1430 may include an image region of the menu 1400.

In operation S1540, the augmented reality device 100 enlarges the region of interest to a preset zoom scale. In combination with operation 3 of FIG. 14 the augmented reality device 100 may enlarge the region of interest 1430 according to a plurality of preset zoom scales (n preset zoom scales). In an embodiment of the disclosure, the augmented reality device 100 may enlarge the region of interest 1430 by using a digital zoom or optical zoom function of the camera 120.

In operation S1550, the augmented reality device 100 performs OCR to determine whether a text may be extracted. Referring to FIG. 14 together, the augmented reality device 100 may perform OCR to determine whether a text is extracted from the enlarged region of interest 1440 in the image 1420.

When it is determined that a text may be extracted from the enlarged image, e.g., in operation S1560, the augmented reality device 100 displays the enlarged image to output the text. In combination with operation 4 of FIG. 14 the augmented reality device 100 may perform OCR to extract a text from the enlarged region of interest 1440 of the image 1420. In the embodiment illustrated in FIG. 14, the augmented reality device 100 may extract a text 'CHICKEN KARAHI' from the enlarged region of interest 1440. The augmented reality device 100 may output the extracted text, for example, 'CHICKEN KARAHI', through the display unit 150. In an embodiment of the disclosure, the augmented reality device 100 may generate a virtual object including the extracted text, and output the text by projecting light of the generated virtual object to the waveguide through the optical projector of the display unit 150.

When it is determined that a text may be extracted from the enlarged image, e.g., in operation S1570, the augmented reality device 100 determines whether the maximum scale of the camera has been reached. Referring to FIG. 14 together, the augmented reality device 100 may determine whether the zoom scale to which the region of interest is enlarged is the maximum zoom scale by digital zoom or optical zoom of the camera 120.

When it is determined that the maximum zoom scale of the camera has been reached, e.g., in operation S1580, the augmented reality device 100 outputs a user interface indicating that text extraction is not possible. For example, the augmented reality device 100 may output a notification message indicating that text extraction is not possible, such as "No text was recognized".

When it is determined that the maximum zoom scale of the camera has not been reached, e.g., in operation S1590, the augmented reality device 100 enlarges the image region by increasing the scale. In an embodiment of the disclosure, the augmented reality device 100 may increase the zoom scale to be greater than the existing scale to enlarge the region of interest. Thereafter, the augmented reality device 100 may return to operation S1540 to determine again whether a text is extracted through OCR from the image region enlarged to the increased zoom scale.

In the embodiment illustrated in FIGS. 14 and 15, the augmented reality device 100 may determine a region of interest based on gaze information of the user, enlarge the region of interest to a preset zoom scale, and recognize a text. However, the disclosure is not limited thereto, and the augmented reality device 100 according to an embodiment of the disclosure may recognize a text by enlarging the region of interest determined based on gaze information of the user, and provide the recognized text as an input to an application that performs search, translation, text-to-speech (TTS) voice output, and the like, thereby expanding the usability. That is, the augmented reality device 100 of the disclosure is not limited to recognizing a payment code as described above with reference to FIGS. 1 to 13, and may be used in a variety of applications, such as recognition, search, translation, or TTS voice output of a text from an object in a real space (e.g., a menu of a restaurant, a product description, or a signboard at a bus stop), thereby expanding the device usability and improving the user convenience.

An aspect of the disclosure provides a method, operated by an augmented reality device 100, of performing a payment by using gaze information of a user. A method operated by the augmented reality device 100 according to an embodiment of the disclosure may include obtaining a gaze point where gaze directions of both eyes of the user converge, based on gaze information of both eyes of the user obtained by using at least one gaze tracking sensor 110 (e.g., S210). The method operated by the augmented reality device 100 may include determining a region of interest corresponding to the gaze point on an image obtained through a camera 120 (e.g., S220). The method operated by the augmented reality device 100 may include enlarging the determined region of interest (e.g., S230). The method operated by the augmented reality device 100 may include recognizing a payment code included in the enlarged region of interest (e.g., S240). The method operated by the augmented reality device 100 may include performing a payment by using the recognized payment code.

In an embodiment of the disclosure, the camera 120 may include a plurality of cameras having different scales. The method operated by the augmented reality device 100 may further include selecting, from among the plurality of cameras, a camera having an optimal scale for recognizing the payment code, based on a distance between the gaze point and the user (e.g., S510). In the determining of the region of interest (e.g., S220), the augmented reality device 100 may determine the region of interest from the image obtained by using the selected camera to photograph the payment code.

In an embodiment of the disclosure, the selecting of the camera 120 (e.g., S510), the augmented reality device 100 may select, from among the plurality of cameras, a camera having a higher scale in proportion to the distance between the gaze point and the user.

In an embodiment of the disclosure, information about a size of the payment code may be obtained in advance and stored in a memory 140. The selecting of the camera 120 (e.g., S510) may further include calculating sizes of regions surrounding the payment code by projecting the payment code onto a plurality of images obtained through the plurality of cameras, respectively, based on the information about the size of the payment code (e.g., S710), and selecting, from among the plurality of cameras, a camera that obtains the image in which the calculated size of the region is largest (e.g., S720).

In an embodiment of the disclosure, the selecting of the camera 120 (e.g., S510) may further include obtaining two-dimensional position coordinate information corresponding to the gaze point in a plurality of images obtained through the plurality of cameras (e.g., S910), and recognizing the presence or absence of the payment code and a size of a region occupied by the payment code from a region set based on the two-dimensional position coordinate information of the gaze point, by performing payment code detection (e.g., S920). the selecting of the camera 120 (e.g., S510) may further include, based on recognizing that the payment code is present, selecting, from among the plurality of cameras, a camera that obtains the image in which the size of the region occupied by the payment code is largest (e.g., S930).

In an embodiment of the disclosure, the camera 120 may include a plurality of cameras. The determining of the region of interest (e.g., S220) may include obtaining a plurality of images by using the plurality of cameras to photograph a region corresponding to the gaze point (e.g., S1110), obtaining two-dimensional position coordinate information corresponding to the gaze point from each of the plurality of obtained images (e.g., S1120), and determining, as a plurality of regions of interest, regions set in the plurality of images based on the obtained two-dimensional position coordinate information (e.g., S1130). The enlarging of the region of interest (e.g., S230) may include enlarging each of the plurality of regions of interest to a preset zoom scale (e.g., S1140). The recognizing of the payment code (e.g., S240) may include recognizing the payment code from the plurality of enlarged regions of interest (e.g., S1150).

In an embodiment of the disclosure, based on failing to recognize the payment code from the plurality of regions of interest, determining the region of interest from an image captured by using a camera other than the plurality of cameras (e.g., S220), enlarging the region of interest to a preset zoom scale (e.g., S230), and recognizing the payment code from an enlarged image region (e.g., S240) may be performed again.

In an embodiment of the disclosure, the camera 120 may include a plurality of cameras. The determining of the region of interest (e.g., S220) may include obtaining a plurality of images by using the plurality of cameras to photograph a region corresponding to the gaze point (e.g., S1310), and obtaining a high-quality image with improved image quality parameters including at least one of a resolution, a contrast ratio, or noise, by performing image processing using the plurality of obtained images (e.g., S1320). The determining of the region of interest (e.g., S220) may further include determining the region of interest based on two-dimensional position coordinate information corresponding to the gaze point on the obtained high-quality image (e.g., S1330).

In an embodiment of the disclosure, the enlarging of the region of interest (e.g., S230) may include enlarging the region of interest to a preset zoom scale.

In an embodiment of the disclosure, based on failing to recognize the payment code, a zoom scale for the region of interest may be increased, and the region of interest may be enlarged by using the increased zoom scale.

In an embodiment of the disclosure, the method operated by the augmented reality device 100 may further include determining whether the increased zoom scale has reached a maximum scale of the camera 120. The method operated by the augmented reality device 100 may further include, based on determining that the increased zoom scale has reached the maximum scale, outputting a user interface indicating a failure to recognize the payment code.

Another aspect of the disclosure provides an augmented reality device 100 for performing a payment by using gaze information of a user. In an embodiment of the disclosure, the augmented reality device 100 may include at least one gaze tracking sensor 110 configured to obtain gaze information of both eyes of the user, a camera 120 configured to obtain an image, a memory 140 storing at least one instruction, and at least one processor 130 configured to execute the at least one instruction. The at least one processor 130 may obtain a gaze point where gaze directions of both eyes of the user converge, based on the gaze information of both eyes of the user obtained through the at least one gaze tracking sensor 110. The at least one processor 130 may determine a region of interest corresponding to the gaze point on an image obtained through the camera 120. The at least one processor 130 may enlarge the determined region of interest. The at least one processor 130 may recognize a payment code included in the enlarged region of interest. The at least one processor 130 may perform a payment by using the recognized payment code.

In an embodiment of the disclosure, the camera 120 may include a plurality of cameras having different scales. The at least one processor 130 may select, from among the plurality of cameras, a camera having an optimal scale for recognizing the payment code, based on a distance between the gaze point and the user. The at least one processor 130 may determine the region of interest from the image obtained by using the selected camera to photograph the payment code.

In an embodiment of the disclosure, the at least one processor 130 may select, from among the plurality of cameras, a camera having a higher scale in proportion to the distance between the gaze point and the user.

In an embodiment of the disclosure, information about a size of the payment code may be obtained in advance and stored in the memory 140. The at least one processor 130 may calculate sizes of regions surrounding the payment code by projecting the payment code onto a plurality of images obtained through the plurality of cameras, respectively, based on the information about the size of the payment code. The at least one processor 130 may select, from among the plurality of cameras, a camera that obtains the image in which the calculated size of the region is largest.

In an embodiment of the disclosure, the at least one processor 130 may obtain two-dimensional position coordinate information corresponding to the gaze point in a plurality of images obtained through the plurality of cameras. The at least one processor 130 may recognize the presence or absence of the payment code and a size of a region occupied by the payment code from a region set based on the two-dimensional position coordinate information of the gaze point, by performing payment code detection. Based on recognizing that the payment code is present, the at least one processor 130 may select, from among the plurality of cameras, a camera that obtains the image in which the size of the region occupied by the payment code is largest.

In an embodiment of the disclosure, the camera 120 may include a plurality of cameras, the plurality of cameras may obtain a plurality of images by photographing a region corresponding to the gaze point. The at least one processor 130 may obtain two-dimensional position coordinate information corresponding to the gaze point from each of the plurality of images obtained through the plurality of cameras, and determine, as a plurality of regions of interest, regions set in the plurality of images based on the obtained two-dimensional position coordinate information. The at least one processor 130 may enlarge each of the plurality of regions of interest to a preset zoom scale. The at least one processor 130 may recognize the payment code from the plurality of enlarged regions of interest.

In an embodiment of the disclosure, the camera 120 may include a plurality of cameras, the plurality of cameras may obtain a plurality of images by photographing a region corresponding to the gaze point. The at least one processor 130 may obtain a high-quality image with improved image quality parameters including at least one of a resolution, a contrast ratio, or noise, by performing image processing using the plurality of images obtained through the plurality of cameras. The at least one processor 130 may determine the region of interest based on two-dimensional position coordinate information corresponding to the gaze point on the obtained high-quality image.

In an embodiment of the disclosure, the at least one processor 130 may enlarge the region of interest to a preset zoom scale.

In an embodiment of the disclosure, based on failing to recognize the payment code, the at least one processor 130 may increase a zoom scale for the region of interest and enlarge the region of interest by using the increased zoom scale.

In an embodiment of the disclosure, the augmented reality device 100 may further include a display unit 150. The at least one processor 130 may determine whether the increased zoom scale has reached a maximum scale of the camera 120. Based on determining that the increased zoom scale has reached the maximum scale, the at least one processor 130 control the display unit 150 to output a user interface indicating a failure to recognize the payment code.

Another aspect of the disclosure provides a computer program product including a computer-readable storage medium. The storage medium may include instructions, which are readable by an augmented reality device 100 and causes the augmented reality device 100 to perform obtaining a gaze point where gaze directions of both eyes of a user converge, based on gaze information of both eyes of the user obtained through at least one gaze tracking sensor 110, determining a region of interest corresponding to the gaze point on an image obtained through the camera 120, enlarging the determined region of interest, recognizing a payment code from the enlarged region of interest, and performing a payment by using the recognized payment code.

A program executable by the augmented reality device 100 described herein may be implemented as a hardware component, a software component, and/or a combination of hardware components and software components. The program is executable by any system capable of executing computer-readable instructions.

The software may include a computer program, code, instructions, or a combination of one or more thereof, and may configure the processor to operate as desired or may independently or collectively instruct the processor.

The software may be implemented as a computer program that includes instructions stored in computer-readable storage media. The computer-readable storage media may include, for example, magnetic storage media (e.g., ROM, RAM, floppy disks, hard disks, etc.) and optical storage media (e.g., a compact disc ROM (CD-ROM), a digital versatile disc (DVD), etc.). The computer-readable recording medium may be distributed in computer systems connected via a network and may store and execute computer-readable code in a distributed manner. The medium is readable by a computer, stored in a memory, and executable by a processor.

The computer-readable storage medium may be provided in the form of a non-transitory storage medium. Here, the term 'non-transitory' simply means that the storage medium is a tangible device, and does not include a signal, but this term does not differentiate between where data is semi-permanently stored in the storage medium and where the data is temporarily stored in the storage medium. For example, the non-transitory storage medium may include a buffer in which data is temporarily stored.

In addition, a program according to embodiments disclosed herein may be provided in a computer program product. The computer program product may be traded as commodities between sellers and buyers.

The computer program product may include a software program and a computer-readable recording medium storing the software program. For example, the computer program product may include a product (e.g., a downloadable application) in the form of a software program electronically distributed through a manufacturer of the augmented reality device 100 or an electronic market (e.g., Samsung Galaxy Store™). For electronic distribution, at least part of the software program may be stored in a storage medium or temporarily generated. In this case, the storage medium may be a storage medium of a server of the manufacturer of the augmented reality device 100, a server of the electronic market, or a relay server that temporarily stores the software program.

The computer program product may include a storage medium of a server or a storage medium of the augmented reality device 100, in a system consisting of the augmented reality device 100 and/or a server. In some embodiments, when there is a third device (e.g., a mobile device such as a smart phone) communicatively connected to the augmented reality device 100, the computer program product may include a storage medium of the third device. In some embodiments, the computer program product may include the software program itself, which is transmitted from the augmented reality device 100 to the third device or transmitted from the third device to the electronic device.

In this case, one of the augmented reality device 100 and the third device may execute the computer program product to perform the method according to the embodiments disclosed herein. In some embodiments, at least one of the augmented reality device 100 or the third device may execute the computer program product to execute the method according to the embodiments disclosed herein in a distributed manner.

For example, the augmented reality device 100 may execute the computer program product stored in the memory 140 (see FIG. 4) to control another electronic device (e.g., a mobile device such as a smart phone) communicatively connected to the augmented reality device 100 to perform the method according to embodiments disclosed herein.

As another example, the third device may execute the computer program product to control an electronic device communicatively connected to the third device to perform the method according to an embodiment disclosed herein.

When the third device executes the computer program product, the third device may download the computer program product from the augmented reality device 100, and execute the downloaded computer program product. In embodiments, the third device may execute the computer program product provided in a pre-loaded state to perform the method according to the embodiments disclosed herein.

Although the embodiments have been described with the limited embodiments and the drawings, various modifications and changes may be made by those of skill in the art from the above description. For example, suitable results may be obtained even when the described techniques are performed in a different order, or when components in a described electronic device, architecture, device, or circuit are coupled or combined in a different manner, or replaced or supplemented by other components or their equivalents.

What is claimed is:

1. A method performing a payment by using gaze information of a user, the method being performed by one or more processors of an augmented reality device, and the method comprising:

obtaining, based on gaze information of both eyes of the user, a gaze point where gaze directions of the both eyes of the user converge, wherein the gaze information is obtained using at least one gaze tracking sensor;

determining a region of interest corresponding to the gaze point on an image obtained through a camera;

enlarging the region of interest;

recognizing a payment code included in the enlarged region of interest; and performing a payment by using the payment code.

2. The method of claim 1, wherein the camera comprises a plurality of cameras having different zoom scales, and the method further comprises:

selecting, from among the plurality of cameras, an optimal camera having an optimal zoom scale for recognizing the payment code, based on a distance between the gaze point and the user, and determining the region of interest corresponding to the gaze point from the image is based on using the optimal camera to photograph the payment code.

3. The method of claim 2, wherein the optimal zoom scale for recognizing the payment code is a highest zoom scale in proportion to the distance between the gaze point and the user.

4. The method of claim 2, wherein information about a size of the payment code is obtained in advance and stored in a memory of the augmented reality device, and the selecting the camera further comprises:

calculating sizes of regions surrounding the payment code by projecting the payment code onto a plurality of images obtained through the plurality of cameras, respectively, based on the information about the size of the payment code; and selecting, from among the plurality of cameras, a large region camera that obtains the image in which a calculated size of a region is largest.

5. The method of claim 2, wherein the selecting the camera further comprises:

obtaining two-dimensional position coordinate information corresponding to the gaze point in a plurality of images obtained through the plurality of cameras;

for the plurality of images obtained through the plurality of cameras, recognizing whether the payment code is present and determining a size of a region occupied by the payment code from a region based on the two-dimensional position coordinate information of the gaze point; and based on recognizing that the payment code is present, selecting, from among the plurality of cameras, a large code camera that obtains the image in which the size of the region occupied by the payment code is largest.

6. The method of claim 1, wherein the camera comprises a plurality of cameras, wherein the determining the region of interest comprises:

obtaining a plurality of images by using the plurality of cameras to photograph a region corresponding to the gaze point;

obtaining two-dimensional position coordinate information corresponding to the gaze point from each of the plurality of images; and determining, as a plurality of regions of interest, regions set in the plurality of images based on the two-dimensional position coordinate information;

wherein the enlarging of the region of interest comprises enlarging each of the plurality of regions of interest to a preset zoom scale; and wherein the recognizing of the payment code comprises recognizing the payment code from the plurality of enlarged regions of interest.

7. The method of claim 1, wherein the camera comprises a plurality of cameras, and wherein the determining the region of interest comprises:

obtaining a plurality of images by using the plurality of cameras to photograph a region corresponding to the gaze point;

obtaining a high-quality image with improved image quality parameters using the plurality of images, wherein the improved image quality parameters comprise at least one of a resolution, a contrast ratio, or noise; and determining the region of interest based on two-dimensional position coordinate information corresponding to the gaze point on the high-quality image.

8. An augmented reality device for performing a payment by using gaze information of a user, the augmented reality device comprising:

at least one gaze tracking sensor configured to obtain gaze information of both eyes of the user;

at least one camera configured to obtain an image;

a memory storing at least one instruction; and at least one processor configured to execute the at least one instruction to:

obtaining, based on gaze information of both eyes of the user, a gaze point where gaze directions of the both eyes of the user converge, wherein the gaze information is obtained using at least one gaze tracking sensor;

determine a region of interest corresponding to the gaze point on an image obtained through the camera;

enlarge the region of interest;

recognize a payment code included in the enlarged region of interest; and perform a payment by using the payment code.

9. The augmented reality device of claim 8, wherein the camera comprises a plurality of cameras having different zoom scales, and wherein the at least one processor is further configured to execute the at least one instruction to:

select, from among the plurality of cameras, an optimal camera having an optimal zoom scale for recognizing the payment code, based on a distance between the gaze point and the user; and determine the region of interest corresponding to the gaze point by using the optimal camera to photograph the payment code.

10. The augmented reality device of claim 9, wherein optimal zoom scale for recognizing the payment code is a highest zoom scale in proportion to the distance between the gaze point and the user.

11. The augmented reality device of claim 9, wherein information about a size of the payment code is obtained in advance and stored in the memory, and wherein the at least one processor is further configured to execute the at least one instruction to:

calculate sizes of regions surrounding the payment code by projecting the payment code onto a plurality of images obtained through the plurality of cameras, respectively, based on the information about the size of the payment code; and select, from among the plurality of cameras, a large region camera that obtains the image in which a calculated size of a region is largest.

12. The augmented reality device of claim 9, wherein the at least one processor is further configured to execute the at least one instruction to:

obtain two-dimensional position coordinate information corresponding to the gaze point in a plurality of images obtained through the plurality of cameras;

for the plurality of images obtained through the plurality of cameras, recognize whether the payment code is present and determining a size of a region occupied by the payment code from a region based on the two-dimensional position coordinate information of the gaze point; and based on recognizing that the payment code is present, select, from among the plurality of cameras, a large code camera that obtains the image in which the size of the region occupied by the payment code is largest.

13. The augmented reality device of claim 8, wherein the camera (120) comprises a plurality of cameras, the plurality of cameras are configured to obtain a plurality of images by photographing a region corresponding to the gaze point, and wherein the at least one processor is further configured to execute the at least one instruction to:

obtain a high-quality image with improved image quality parameters using the plurality of images obtained through the plurality of cameras, wherein the improved image quality parameters comprise at least one of a resolution, a contrast ratio, or noise; and determine the region of interest based on two-dimensional position coordinate information corresponding to the gaze point on the high-quality image.

14. The augmented reality device of claim 8, wherein the at least one processor is further configured to execute the at least one instruction to:

based on failing to recognize the payment code, increase a zoom scale for the region of interest; and enlarge the region of interest by using the increased zoom scale.

15. A non-transitory computer-readable storage medium storing one or more instructions, that when executed by a processor, cause an augmented reality device to perform:

obtaining, based on gaze information of both eyes of the user, a gaze point where gaze directions of the both eyes of the user converge, wherein the gaze information is obtained using at least one gaze tracking sensor;

determining a region of interest corresponding to the gaze point on an image obtained through the camera;

enlarging the region of interest;

recognizing a payment code from the enlarged region of interest; and performing a payment by using the payment code.

* * * * *